United States Patent
Dixit et al.

(10) Patent No.: US 11,899,695 B2
(45) Date of Patent: Feb. 13, 2024

(54) FIELD EXTENSION HUB FOR EXTENSION FIELDS ACROSS A CUSTOMER LANDSCAPE

(71) Applicant: SAP SE, Walldorf (DE)

(72) Inventors: Sharad Dixit, Kanpur Nagar (IN); Sebastian Wennemers, Mannheim (DE); Daniel Oberle, Durmersheim (DE); Eduard Stelle, Ubstadt-Weiher (DE); Chandrashekhar Putcha, Aurora, IL (US); Soenke Scharnhorst, Weinheim (DE)

(73) Assignee: SAP SE, Walldorf (DE)

( * ) Notice: Subject to any disclaimer, the term of this patent is extended or adjusted under 35 U.S.C. 154(b) by 75 days.

(21) Appl. No.: 17/155,926

(22) Filed: Jan. 22, 2021

(65) Prior Publication Data

US 2022/0237212 A1 Jul. 28, 2022

(51) Int. Cl.
*G06F 7/00* (2006.01)
*G06F 16/28* (2019.01)
*G06F 16/2457* (2019.01)
*G06F 16/958* (2019.01)
*G06F 16/955* (2019.01)

(52) U.S. Cl.
CPC ...... *G06F 16/288* (2019.01); *G06F 16/24573* (2019.01); *G06F 16/958* (2019.01); *G06F 16/9566* (2019.01)

(58) Field of Classification Search
CPC ............. G06F 16/288; G06F 16/24573; G06F 16/958; G06F 16/9566
USPC ........................................ 707/737, 722, 769
See application file for complete search history.

(56) References Cited

U.S. PATENT DOCUMENTS

| | | | |
|---|---|---|---|
| 8,078,568 B2 | 12/2011 | Stuhec et al. | |
| 8,346,747 B2* | 1/2013 | Liu | G06F 16/27 707/705 |
| 8,768,923 B2 | 7/2014 | Drumm et al. | |
| 9,171,060 B2* | 10/2015 | Oberle | G06F 16/289 |
| 9,542,484 B2* | 1/2017 | Oberle | G06F 16/367 |

(Continued)

OTHER PUBLICATIONS

Help.sap.com [online], "Master Data Integration" Aug. 2020, [retrieved on Mar. 15, 2021], retrieved from: URL <https://help.sap.com/viewer/99218f2c48044ddc8f2ea30adc0e38a1/7.1.21/en-US/46b8065a4df01517e10000000a114a6b.html?q=master%20data%20integration>, 4 pages.

(Continued)

*Primary Examiner* — Md I Uddin
(74) *Attorney, Agent, or Firm* — Fish & Richardson P.C.

(57) ABSTRACT

The present disclosure involves systems, software, and computer implemented methods for creating an extension field across system tenants in a customer landscape. One example method includes receiving a request to add an extension field to an entity used in a customer landscape. Entity-using system tenants that use the entity are determined. Event-pairing information is provided to each entity-using system tenant to enable receiving of extension field events. Field attribute values for a set of field attributes for the extension field are received. A field creation event is generated that instructs a system tenant receiving the field creation event to create a local field that has a target state of the extension field in that system tenant. The field creation event is sent to each entity-using system tenant.

19 Claims, 18 Drawing Sheets

(56) References Cited

U.S. PATENT DOCUMENTS

| | | |
|---|---|---|
| 10,127,147 B2 | 11/2018 | Oberle |
| 10,200,439 B2 | 2/2019 | Oberle |
| 10,318,402 B2 | 6/2019 | Oberle |
| 10,509,843 B2* | 12/2019 | Bare ................... G06F 16/9566 |
| 2007/0288250 A1* | 12/2007 | Lemcke ................ G06Q 30/00 |
| | | 705/300 |
| 2009/0089109 A1* | 4/2009 | Rabetge ............... G06Q 10/063 |
| | | 705/7.29 |
| 2014/0280370 A1* | 9/2014 | Oberle ................. G06F 16/289 |
| | | 707/803 |
| 2018/0167402 A1* | 6/2018 | Scheidler ............... G06N 20/00 |
| 2018/0182049 A1 | 6/2018 | Oberle |
| 2019/0102162 A1* | 4/2019 | Pitre .................... H04L 63/102 |
| 2020/0201609 A1 | 6/2020 | Schaus et al. |

OTHER PUBLICATIONS

Help.sap.com [online], "What Is SAP Cloud Integration?" Oct. 2020, [retrieved on Mar. 15, 2021], retrieved from: URL <https://help.sap.com/viewer/368c481cd6954bdfa5d0435479fd4eaf/Cloud/en-US/e12c09cc8e9b4574b092d8964b049ce6.html>, 8 pages.

Wikipedia.org [online], "Master data management" Jan. 2008, [retrieved on Mar. 15, 2021], retrieved from: URL <https://en.wikipedia.org/wiki/Master_data_management>, 8 pages.

Wikipedia.org [online], "System integration" Dec. 2006, [retrieved on Mar. 15, 2021], retrieved from: URL<https://en.wikipedia.org/wiki/System_integration>, 4 pages.

Extended European Search Report issued in European Appln. No. 21192771.0 dated Feb. 18, 2022, 8 pages.

* cited by examiner

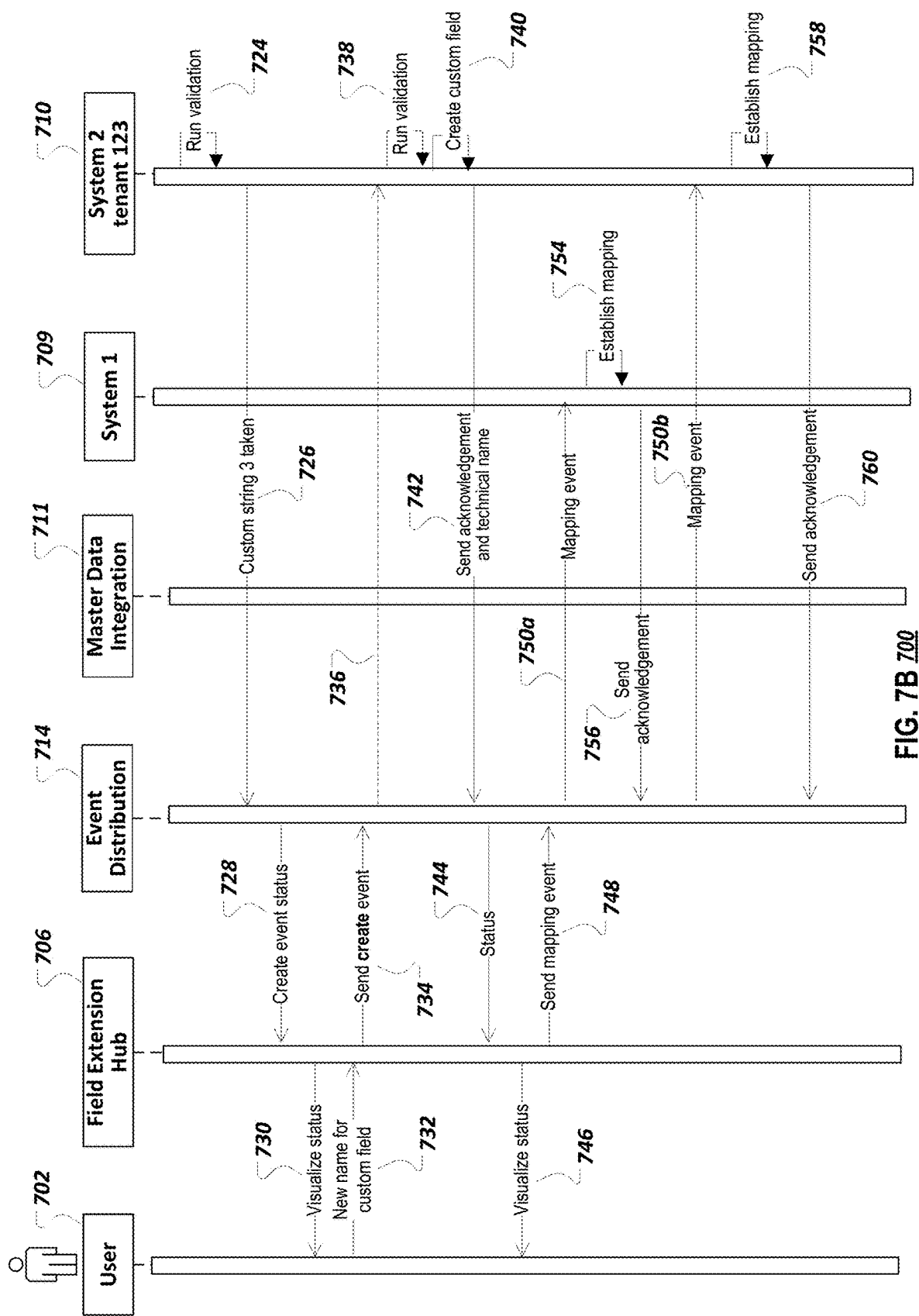

JobDetails — 1004
corp.odm.workforce

Attributes — 1002

| Name | Type | Description |
|---|---|---|
| status | workforce.company.JobDetailStatusCode | Status of the worker(s) job |
| legal | CompanyCode | Line to Company Code |
| costsCenter | Association to one financecostobject.CostCenter | Organizational Line to which costs are allocated |
| fte | Decimal (3.2) | Full time employee (FTE) |
| workinghoursPerWeek | Decimal (5.2) | Working hours per week |
| workingDaysPerWeek | Decimal (3.2) | Working days per week |
| job | Job | Reference to a specific job |
| jobTitle | Starting(256) | Job title |
| supervisorWorkAssignment | SupervisorWorkAssignment | Supervisor work assignment |
| country | common.CountryCode | The country the job is valid for |

EXTENSION FIELDS

| Context | Tenant | Field Name | Namespace | Label | Tooltip | Type | Max Length | Status | 1401 |
|---|---|---|---|---|---|---|---|---|---|
| ☑ corp.odm.workforce .JobDetails | | PilotLicense | com.airline | Pilot License | Pilot License ID | Text | 10 | Done | Analyze |
| | System1 *1408* | ZZFLD_PL_LIC — *1414* | | | | | | Done — *1402* | Analyze |
| | mds *1420* | PilotLicense | com.airline | | | | | Done | Analyze |
| | System2- *1410* Tenant123 | customString2 *1416* | | | | | | Done — *1404* | Analyze |
| | CPI inflow replicate employee from *1422* System2 tenant 123 | | | | | | | Done | |
| | System3- *1412* Tenantxyz | Pilot_License *1418* | | | | | | Done — *1406* | Analyze |
| | | | | | | | | | |
| | | | | | | | | | |

EXTENSION FIELDS

| Context | Tenant | Field Name | Namespace | Label | Tooltip | Type | Max Length | Status | |
|---|---|---|---|---|---|---|---|---|---|
| ☑ corp.odm.workforce .JobDetails | | CostLevel | com.airline | Cost Level | Service Cost Level | Text | 4  *1602* | Error | Analyze |
| ☐ | System1 *1607* | COST_LEVEL *1606* | com.airline | | | | *1604* | Done | Analyze |
| ☐ | rnds *1610* | CostLevel | com.airline | | | | *1608* | Done | Analyze |
| ☐ | System2-*1612* Tenant123 | customString3 *1616* | com.airline | | | | *1614* | Name-Err | Analyze *1618* |
| ☐ | | | | | | | | | |

FIELD EXTENSION HUB FOR EXTENSION FIELDS ACROSS A CUSTOMER LANDSCAPE

TECHNICAL FIELD

The present disclosure relates to computer-implemented methods, software, and systems for creating an extension field across system tenants in a customer landscape.

BACKGROUND

In an enterprise, a collection of technologies and services can form a middleware framework to enable integration of systems and applications across the enterprise. An integration scenario can describe an interaction between a source system and a destination system, and can include, for example, mapping information that describes mapping of source system information to corresponding target system information.

SUMMARY

The present disclosure involves systems, software, and computer implemented methods for creating an extension field across system tenants in a customer landscape. An example method includes: receiving a request to add an extension field to an entity used in a customer landscape, wherein the customer landscape includes multiple system tenants of different types of systems; determining, from among the multiple system tenants, at least one entity-using system tenant that uses the entity in at least one process; providing event-pairing information to each entity-using system tenant to enable each entity-using system tenant to receive extension field events; receiving field attribute values for a set of field attributes for the extension field, wherein the field attribute values describe a target state of the extension field; generating, using the received field attribute values, a field creation event that instructs a system tenant receiving the field creation event to create a local field that has the target state of the extension field in that system tenant; and sending the field creation event to each entity-using system tenant, wherein each respective local field created by a respective entity-using system tenant in response to receiving the field creation event has the target state of the extension field.

These and other implementations may include some or all of the following features. The entity can be a business object or another type of object. An integration component can be updated by updating integration content to map a first local field of a first entity-using system tenant to a second local field of a second entity-using system tenant. Configuring of an additional system tenant to receive the field creation event can be added using a user interface. At least some of the system tenants can be associated with different vendors. Before receiving the field attribute values, extensibility capabilities of each entity-using system tenant can be determined. Selection of an extensibility capability for a first entity-using system tenant for use by the first entity-using system tenant can be enabled when creating a first local field in the first entity-using system tenant. Receiving field attribute values for a set of field attributes for the extension field comprises can include enabling selection of field attribute values for aligned field attributes that have been determined to reflect commonality for describing extension fields in the system tenants in the landscape. The aligned field attributes that have been determined to reflect commonality for describing extension fields can include a context attribute, a namespace attribute, a technical field name, a field data type, a field size, a field label, and a field tool tip. A process identifier of a selected process in which to create an extensibility requirement can be received. Receiving the request to add an extension field to an entity can include determining that the selected process uses the entity. A selection of an existing field in a first entity-using system tenant can be received. One or more local fields created in one or more other entity-using system tenants can be mapped to the existing field in the first entity-using system tenant.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIGS. 7A-7B illustrate a swim lane diagram of an example process for creating an extension field based on an existing field.

FIG. 10 illustrates an example entity user interface.

FIG. 14 illustrates an example status user interface.

FIG. 16 illustrates an example status user interface.

DETAILED DESCRIPTION

Figure 1:
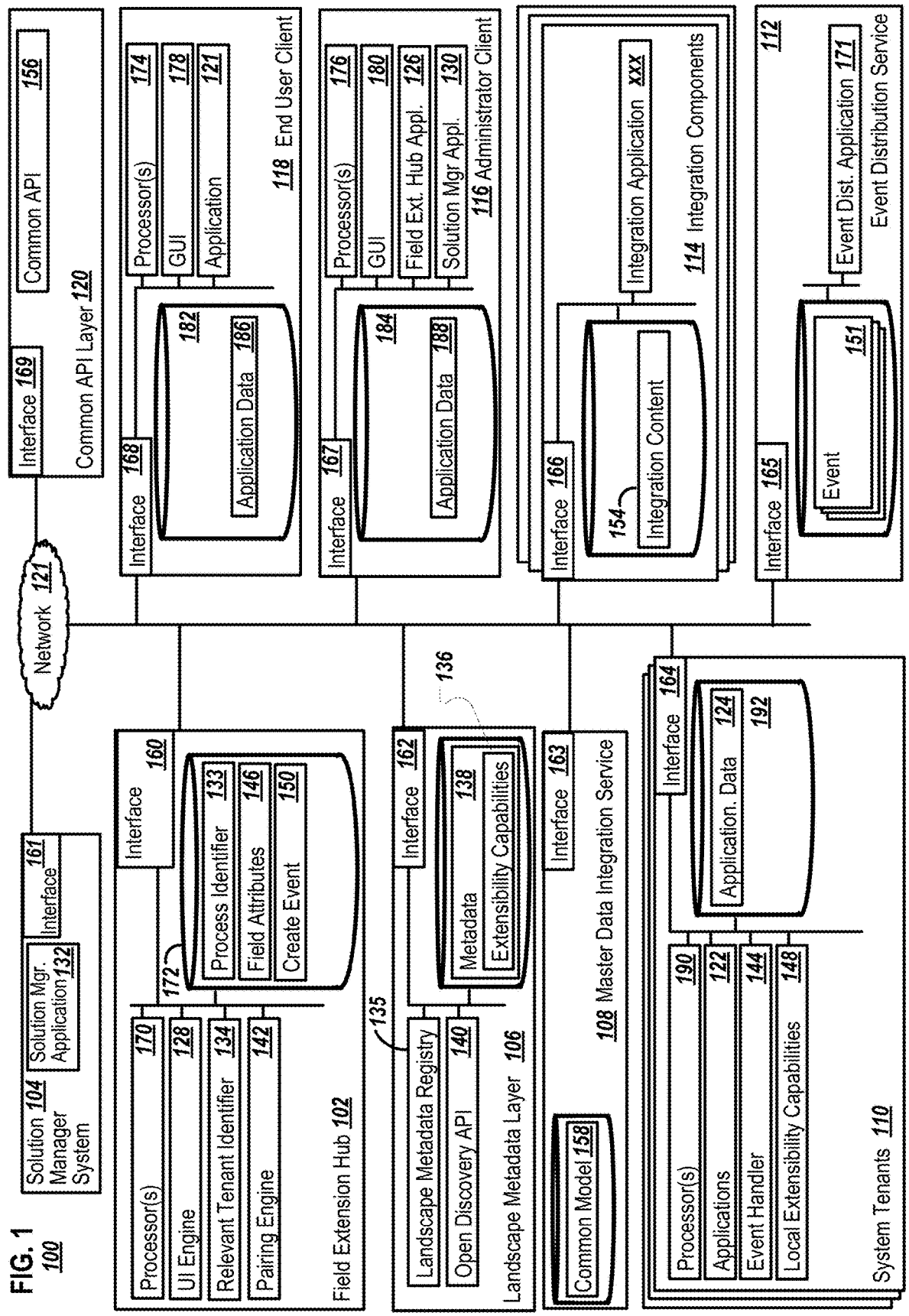
FIG. 1 is a block diagram illustrating an example system for creating an extension field across system tenants in a customer landscape.

A service provider may offer a heterogeneous combination of technology products or systems. The combination of products may include solutions that have been developed by the service provider and products that have been acquired by the service provider. The service provider may, for example, occasionally (both historically and part of an ongoing strategy) acquire products to address specific functionalities and processes and/or to otherwise enhance a technology suite. The technology suite can include a variety of technologies across the products and solutions of the suite. Each product can address specific functions or processes associated with the organization of the customer. Collectively, the combination of products can be used to meet the overall end-to-end needs of the customer.

When customers purchase multiple different products from the service provider, the customer may generally expect that the different products and systems will work together in an integrated fashion with information sharing between systems. Accordingly, regardless of number and type of offered technologies, the service provider can offer product integration to manage processes that may span multiple product offerings. For instance, when processes span multiple products, there can be a need for information to be distributed across the different products from one product to another as a part of an overall process flow.

The service provider can offer customization features to customers that enable the customer to add custom behavior specific to the customer's processes. For example, a customer may desire to add a custom extension field that may be used throughout one or more integrated cross-product processes. For example, the extension field may not be currently present in any systems used by the customer or may be present in some but not all used systems. The service provider can enable the customer to add the new custom field. For example, the customer may desire to add a COVID risk group field to a Workforce-Person entity that is used in different processes across different products. As another example, the customer may desire to add a pilot license field to the Workforce-Person entity, to store information regarding pilot licenses that may be held by employees of the customer. For a new field, the customer may desire/expect that the field be added to (or otherwise made accessible to) each of multiple systems of the service provider used by the customer.

In further detail, the standard products offered by the service provider can provide persistency for entities using data objects (which in some cases can be referred to as business objects). A WorkforcePerson entity can be represented as a data object, for example. Each data object can have nodes and fields. A standard schema provided by the service provider can define a common set of fields for data objects. However, as mentioned, a standard offering may not suffice to capture all of the needs of the customer. Therefore, custom field (e.g., extension field) capability can be provided, for data objects, entities, or other similar or suitable constructs. In general, solutions described herein may be applied to entities, objects, or other constructs. Although individual service provider products can support extension field capability, a customer may typically have a heterogeneous landscape with a number of integrated standard products. Problems can occur when a custom field needs to be exchanged between at least two of the products used by the customer.

For example, adding a field across systems can be challenging and time consuming. The service provider may find it challenging to provide a unified extension experience across all products, since some products, such as those recently acquired, may have different extension interfaces and capabilities than other offered products. Accordingly, the customer may learn and use different customization and extensibility approaches used in different interfaces of the different product offerings. Each product may have prerequisite knowledge generally held by technology or product-specific consultants or experts. To manually add or affect a new custom field change across systems may require input and effort by multiple technology consultants or experts, along with other stakeholders such as end users, key users, business managers, approvers, information technology personnel, integration consultants, etc. In general, separate manual efforts can be resource intensive as far as cost, time, and use of computing resources.

As an alternative to costly and potentially duplicative manual efforts, a field extension hub can be used. For instance, rather than separately adding the field to different systems and integration components, a central field extension hub can be used that can enable a customer user, such as a process analyst, to define and add an extension field without requiring involvement of technical integration consultants of the individual systems. The field extension hub can serve as a central tool for field extensibility in an intelligent enterprise. The field extension hub can support, along with the generation of field extensions, automatic enhancement of integration middleware and mapping of existing fields of one system against extension fields in another system. Creating and maintaining custom fields with the field extension hub can be subdivided in the following four phases: 1) pairing and capability discovery (e.g., an initialization phase); 2) generation of an extension field (e.g., a design-time phase); 3) mapping and transferring of an extension field data across solutions (e.g., a run-time phase); and 4) deploying an extension field (e.g., a cross-system transfer phase).

Other advantages can include use of the field extension hub to harmonize and automate creation and maintenance of custom fields across an entire technology suite offered by a service provider. Automation can result in reduced or avoided redundant development. Additionally, extensions and corresponding system integrations can be managed even when different systems are connected with complex integration scenarios. New products that are developed or acquired can be plugged into the field extension hub so that custom fields can be automatically added to those systems using the field extension hub.

The field extension hub can be used by service provider customers, service provider partners, and the service provider itself. Each type of entity that uses the field extension hub can receive various benefits. For instance, product team functional leads of the service provider can use the field extension hub to view end-to-end process flows (across applications) to identify, in functional designs, integration and extension needs for integrated products offered by the service provider. Technical leads can use the field extension hub to implement functional designs using field extensions and/or by replicating a new field across multiple applications or interfaces. The field extension hub can therefore enable the service provider to improve integration tools provided by the service provider and improve creation of an integrated suite of products for consumers. Accordingly, the service provider can offer products that are pre-configured for integration with other offered products. The service provider may also be a consumer of the service provider's offerings, including the field extension hub (e.g., the service provider may use its own products to run its own enterprise).

Service provider customers can realize various benefits from the field extension hub. As mentioned, customers may use multiple products offered by the service provider, including products acquired by the service provider. A customer who uses an acquired product may expect (and desire) that the acquired product is (or becomes) integrated with other products offered by the service provider. Customers can use product(s) offered by the service provider to define and manage end-to-end scenarios that may involve multiple products. A scenario may utilize various items of information, and the customer can use the field extension hub to manage creation and population of fields so that a given field may be replicated and used across systems. Customers may often need custom logic to achieve specific functionality or advantages, and custom logic may require introduction of additional fields that are to be referenced by the custom logic. For example, a customer process expert can define requirements and scenarios, identify process steps, identify gaps within overall processes, and identify one or more fields that may solve an identified process gap. Customers can benefit from an ability of the field extension hub to efficiently manage field extensions across multiple applications and interfaces, from a process perspective.

Service provider partners can develop custom solutions for specific (e.g. niche) industry solutions for various industry verticals (e.g., oil, retail, others). Partner solutions may result in a need for additional fields across one or more products offered by the service provider. A partner-developed solution can be designed to work in a cross-product landscape, for example. Partners with industry-specific requirements may generally add custom, industry-specific logic which may require new field(s). The partner can work with the service provider, such as before a partner solution is deployed, to consider whether partner-needed fields may be added as standard fields and/or whether the field extension hub can be used to integrate new custom field(s) used by a partner solution with other offered products.

The field extension hub can be used by or provide benefits to various types of users or employees of different roles or personas with the service provider, customer, and/or partners. For example, customer, service provider, and partner management can know that the field extension hub enables a confident choice of integratable products for digital transformation of a respective entity, based on the field extension hub enabling seamless integration of service provider products.

As another example, process experts can use the field extension hub to not only add a field in a given system as part of process logic for a specific process scenario, but to learn and select from other systems in a landscape that may also need the field to enable end-to-end seamless execution of the process. The field extension hub can enable the process expert to identify whether an already-available field, rather than a new field, may be used for a needed purpose, for some or all identified systems. Furthermore, the process expert can use the field extension hub to consistently extend objects in a distributed landscape, using a high level request for a need for a new field, without needing to understand technical details for how the new field will be propagated across different systems in the landscape.

Integration architects (or other technical users) can use the field extension hub to perform various technical tasks. For example, an integration architect can, among other tasks, use the field extension hub to: 1) have a cockpit for defining extension fields for use across systems in one interface; 2) add attribute extension fields; 3) specify the system(s) in which an extension field may be used; 4) centrally view/edit data objects across multiple systems; 5) add a field based on an object resulting in modifications to all systems that use the object; 6) have specified objects, fields, and attributes extended to selected systems rather than all systems in the landscape; 7) extend integration content related to an extension field; 8) extend integration content (with additional field mapping) without needing to change message structures in involved integration layers; and 9) search for extension fields in the landscape. Other benefits and features are described below.

FIG. 1 is a block diagram illustrating an example system 100 for creating an extension field across system tenants in a customer landscape. Specifically, the illustrated system 100 includes or is communicably coupled with a field extension hub 102, a solution manager system 104, a landscape metadata layer 106, a master data integration service 108, system tenants 110 (e.g., tenants of various types of systems in a customer landscape, potentially from multiple, different vendors), an event distribution service 112, integration components 114, an administrator client 116, an end user client 118, a common API layer 120, and a network 121. Although shown separately, in some implementations, functionality of two or more systems or servers may be provided by a single system or server. In some implementations, the functionality of one illustrated system, server, or component may be provided by multiple systems, servers, or components, respectively.

An end user of a customer of a service provider may use a client application 121 running on the end user client device 118 to access one or more server (or cloud) applications 122 and/or application data 124 provided by one or more of the system tenants 110. Over time, the customer may have a need to extend the applications 122 and/or the application data 124 to incorporate a new field. To reduce complexity and effort of adding the new field, an administrator (or developer) of the customer can use the administrator client device 116 to access one or more field extension hub client applications 126 provided by a UI (User Interface) engine 128 of the field extension hub 102.

In some implementations, the administrator may use a solution manager client application 130 corresponding to a solution manager application 132 (or service) provided by the solution manager system 104. The solution manager client application 130 may enable the administrator to view and modify customer application and process requirements. The solution manager client application 130 may enable the administrator to request addition of a new extension field as part of an extensibility requirement that is an adjustment to a selected process. The solution manager client application 130 can navigate the administrator to a field extension hub application 126 to complete the extension field addition.

The field extension hub application 126 can be provided (e.g., by the solution manager system 104) or otherwise receive or identify a process identifier 133 of the selected process. A relevant tenant identifier 134 field extension hub 102 can determine which system tenants 110 are involved in the selected process. The relevant tenant identifier 134 can query a landscape metadata registry 135 included in the landscape metadata layer 106 to obtain extensibility capabilities of the system tenants 110 that are relevant to the selected process. The landscape metadata registry 135 can maintain extensibility capabilities 136 of system tenants 110 in stored metadata 138. The landscape metadata registry 135 can obtain the extensibility capabilities 136 by using an open discovery API 140 to query the system tenants 110 for extensibility capabilities, and, in some instances, can organize the extensibility capabilities 136 by process identifier and can therefore provide a subset of the extensibilities 136 that correspond to the process identifier 133 in response to a query from the field extension hub 102.

After the relevant tenant identifier 134 has identified a set of relevant system tenants 110 that are relevant to the selected process, a pairing engine 142 can pair with each of the relevant system tenants 110. Pairing can include enabling each relevant system tenant 110 to receive subsequent events from the field extension hub 102. The field extension hub 102 can trigger each relevant system tenant 110 to create an extension field, for example. Each system tenant 110 can implement an event handler 144 that can receive events from the field extension hub 102. In some implementations, the field extension hub 102 uses (or in some cases has) the event distribution service 112, for sending events to relevant system tenants 110.

The administrator can use the field extension hub client application 126 to specify field attributes of the new field. The specified field attributes can be provided to the field extension hub 102 as new field attributes 148. The new field attributes 148 can be specified using an aligned extension field description that can be understood by each of the system tenants 110. As described in more detail below, the administrator can also tailor which system tenants 110 are to add the new field (e.g., by adding to or removing from a set of relevant tenants). Additionally, the administrator can request particular local extensibility capabilities 148 of one or more system tenants 110, to use with or for the new extension field. The field extension hub 102 can obtain information about the local extensibility capabilities 148 from the landscape metadata registry 135, for example.

After characteristics of the new field addition are configured, the field extension hub 102 can use the event distribution service 112 to propagate a creation event 150 to each of the relevant system tenants 110 (e.g., as a propagated event 151). The creation event 150 can describe a target state (e.g., a "to-be" state) of a field to create, to implement the new extension field. Each respective event handler 144 of each relevant system tenant 110 can, on a system-specific basis, perform or request tasks that may be system/tenant-specific, for creating the new extension field in the respective system tenant 110. The event handler 144 can invoke or use the local extensibility capabilities 148 (which can include a local API), or perform any other suitable work for creating the new extension field in the respective system tenant 110, to implement the new extension field target state specified in the creation event 150.

Additionally, the field extension hub 102 can send event(s) to other components, such as the integration components 114 and/or the common API layer 120, for updating integration content 154 provided by the integration components 114 or a common API 156 provided by the common API layer 120, respectively. Other features and scenarios are described in more detail below, including creating a new extension field mapped to an existing field, and updating and use of a common domain model 158 provided by the master data integration service 108. The master data integration service can, for example, enable a harmonized integration and distribution of different master data items between different products As used in the present disclosure, the term "computer" is intended to encompass any suitable processing device. Each of the depicted systems or devices may be or be included in any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, each computing device may be adapted to execute any operating system, including Linux, UNIX, Windows, Mac OS®, Java™, Android™, iOS or any other suitable operating system.

Interfaces 160, 161, 162, 163, 164, 165, 166, 167, 168, and 169 are used by the field extension hub 102, the solution manager system 104, the landscape metadata layer 106, the master data integration service 108, the system tenants 110, the event distribution service 112, the integration components 114, the administrator client 116, the end user client 118, and the common API layer 120, respectively, for communicating with other systems in a distributed environment—including within the system 100—connected to the network 121. Generally, the interfaces 160-169 each comprise logic encoded in software and/or hardware in a suitable combination and operable to communicate with the network 121. More specifically, the interfaces 160-169 may each comprise software supporting one or more communication protocols associated with communications such that the network 121 or interface's hardware is operable to communicate physical signals within and outside of the illustrated system 100. Although each of the field extension hub 102, the solution manager system 104, the landscape metadata layer 106, the master data integration service 108, the system tenants 110, the event distribution service 112, the integration components 114, the administrator client 116, the end user client 118, and the common API layer 120 are shown as separate network-connected devices or systems, some devices or systems may in fact be part of a same device or system.

The field extension hub 102 includes one or more processors 170. Each processor 170 may be a central processing unit (CPU), a blade, an application specific integrated circuit (ASIC), a field-programmable gate array (FPGA), or another suitable component. Generally, each processor 170 executes instructions and manipulates data to perform the operations of the field extension hub 102. Specifically, each processor 170 executes the functionality required to receive and respond to requests from the administrator client 116, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The field extension hub 102 includes memory 172. In some implementations, the field extension hub 102 includes multiple memories. The memory 172 may include any type of memory or database module and may take the form of volatile and/or non-volatile memory including, without limitation, magnetic media, optical media, random access memory (RAM), read-only memory (ROM), removable media, or any other suitable local or remote memory component. The memory 172 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the field extension hub 102.

The end user client 118 and the administrator client 116 may each generally be any computing device operable to connect to or communicate with other systems via the network 121 using a wireline or wireless connection. In general, the end user client 118 and the administrator client 116 each comprise an electronic computer device operable to receive, transmit, process, and store any appropriate data associated with the system 100 of FIG. 1. The end user client 118 and the administrator client 116 can each include one or more client applications, including the application 121 or the field extension hub client application 126, respectively. A client application is any type of application that allows a client device to request and view content on the client device. In some implementations, a client application can use parameters, metadata, and other information received at launch to access a particular set of data from a given server. In some instances, a client application may be an agent or client-side version of the one or more enterprise applications running on an enterprise server (not shown).

The end user client 118 and the administrator client 116 each respectively includes one or more processors 174 or 176. Each processor 174 or 176 may be a central processing unit (CPU), an application specific integrated circuit (ASIC), a field-programmable gate array (FPGA), or another suitable component. Generally, each processor 174 or 176 executes instructions and manipulates data to perform the operations of the respective client device. Specifically, each processor 174 or 176 executes the functionality required to send requests to the server 102 and to receive and process responses from other components in the system 100.

The end user client 118 and the administrator client 116 are each generally intended to encompass any client computing device such as a laptop/notebook computer, wireless data port, smart phone, personal data assistant (PDA), tablet computing device, one or more processors within these devices, or any other suitable processing device. For example, the end user client 118 and the administrator client 116 may each comprise a computer that includes an input device, such as a keypad, touch screen, or other device that can accept user information, and an output device that conveys information associated with the operation of the system 100, or the client device itself, including digital data, visual information, or a GUI 178 or 180.

Each GUI 178 or 180 interfaces with at least a portion of the system 100 for any suitable purpose, including generating a visual representation of the application 121 or the field extension hub client application 126, respectively. In particular, each GUI 178 or 180 may be used to view and navigate various Web pages, or other user interfaces. Generally, each GUI 178 or 180 provides a user with an efficient and user-friendly presentation of data provided by or communicated within the system. Each GUI 178 or 180 may comprise a plurality of customizable frames or views having interactive fields, pull-down lists, and buttons operated by the user. Each GUI 178 or 180 contemplates any suitable graphical user interface, such as a combination of a generic web browser, intelligent engine, and command line interface (CLI) that processes information and efficiently presents the results to the user visually.

Memory 182 or 184 included in the end user client 118 or the administrator client 116, respectively, may include any memory or database module and may take the form of volatile or non-volatile memory including, without limitation, magnetic media, optical media, random access memory (RAM), read-only memory (ROM), removable media, or any other suitable local or remote memory component. The memory 182 or 184 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device. For example, the memory 182 may include application data 186 used by the application 121. As another example, the memory 184 may include application data 188 used by the field extension hub client application 126.

Each system tenant 110 includes one or more processors 190. Each processor 190 may be a central processing unit (CPU), a blade, an application specific integrated circuit (ASIC), a field-programmable gate array (FPGA), or another suitable component. Generally, each processor 190 executes instructions and manipulates data to perform the operations of the respective system tenant 110. Specifically, each processor 190 executes the functionality required to receive and respond to requests from the end user client 118, for example.

Each system tenant 110 includes memory 192. In some implementations, a system tenant 110 can include multiple memories. The memory 192 may include any type of memory or database module and may take the form of volatile and/or non-volatile memory including, without limitation, magnetic media, optical media, random access memory (RAM), read-only memory (ROM), removable media, or any other suitable local or remote memory component. The memory 192 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the respective system tenant 110.

Figure 2:
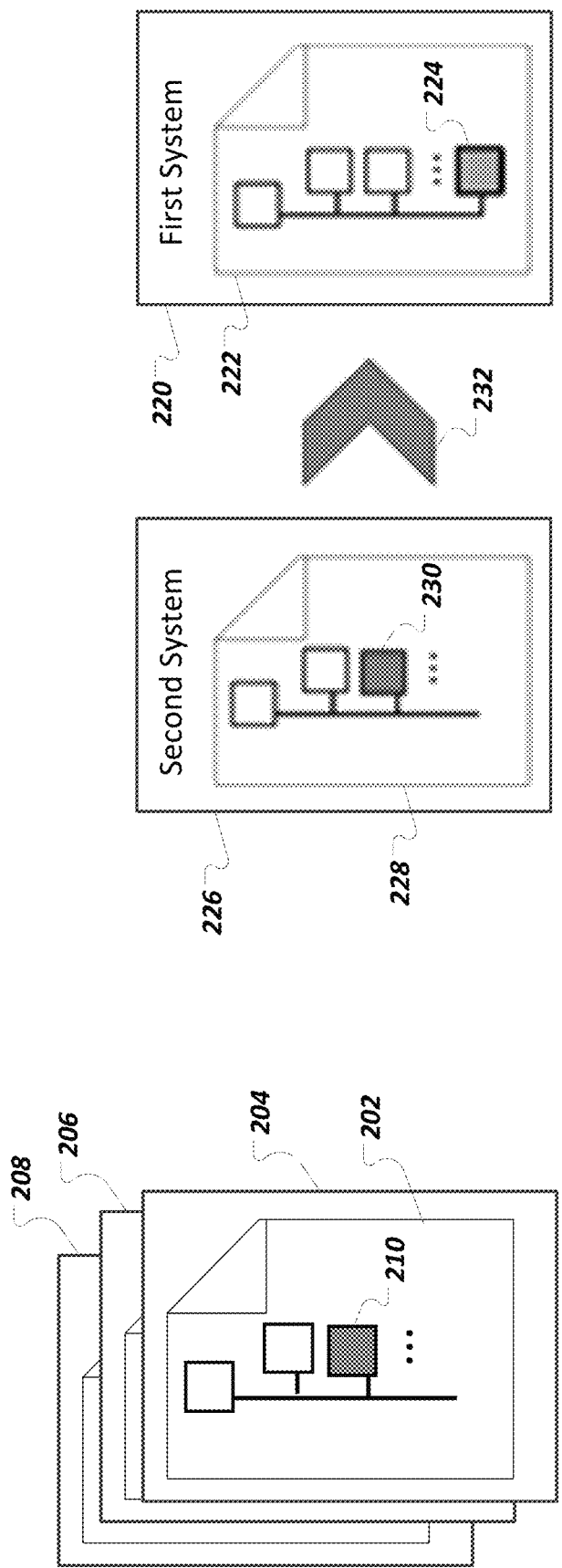
FIGS. 2A-2B illustrate example field extension hub scenarios.

FIGS. 2A-2B illustrate example field extension hub scenarios. The field extension hub can be used for different field-based scenarios. For example and as shown in FIG. 2A, the field extension hub can be used to create a new field across different systems. For example, a process expert or analyst may desire to extend an entity 202, such as a WorkforcePerson entity, across multiple products (e.g., products 204, 206, and 208) with a field 210 that is new to each product. The field extension hub can determine which products in a landscape use the entity and enable the analyst to choose which of those products to extend. As described in more detail below, in addition to extending selected systems, the field extension hub can automatically enhance integration middleware so that data in the field 210 can be exchanged during runtime processes.

As another example and as shown in FIG. 2B, the field extension hub can handle and manage a scenario in which a new field is created in one or more systems and mapped to one or more existing fields in other system(s). For example, a first system 220 can include an entity 222 that includes an existing field 224. A second system 226 may include an entity 228 that generally corresponds to the entity 222, but which does not currently have a field that corresponds to the existing field 224 in the entity 222. An analyst can use the field extension hub to create a new field 230 and map the new field 230 to the existing field 224. A chevron 232 represents automatically updated integration content including addition of a custom field mapping that maps the existing field 224 to the new field 230.

As an example, the entity 222 and the entity 228 can be or correspond to a WorkforcePerson entity, and the existing field 224 and the new field 230 can each be a service cost level field, for instance. The first system 220 may include the existing field 224 as a predefined service cost level field, and the field extension hub can create the new field 230 as a custom service cost level field. The field extension hub can enable selection of the existing field 224 as a suitable standard service cost level field for a given application or process and selection of the second system 226 as a target system in which to create the new field 230 as a new custom service cost level field.

Figure 3:
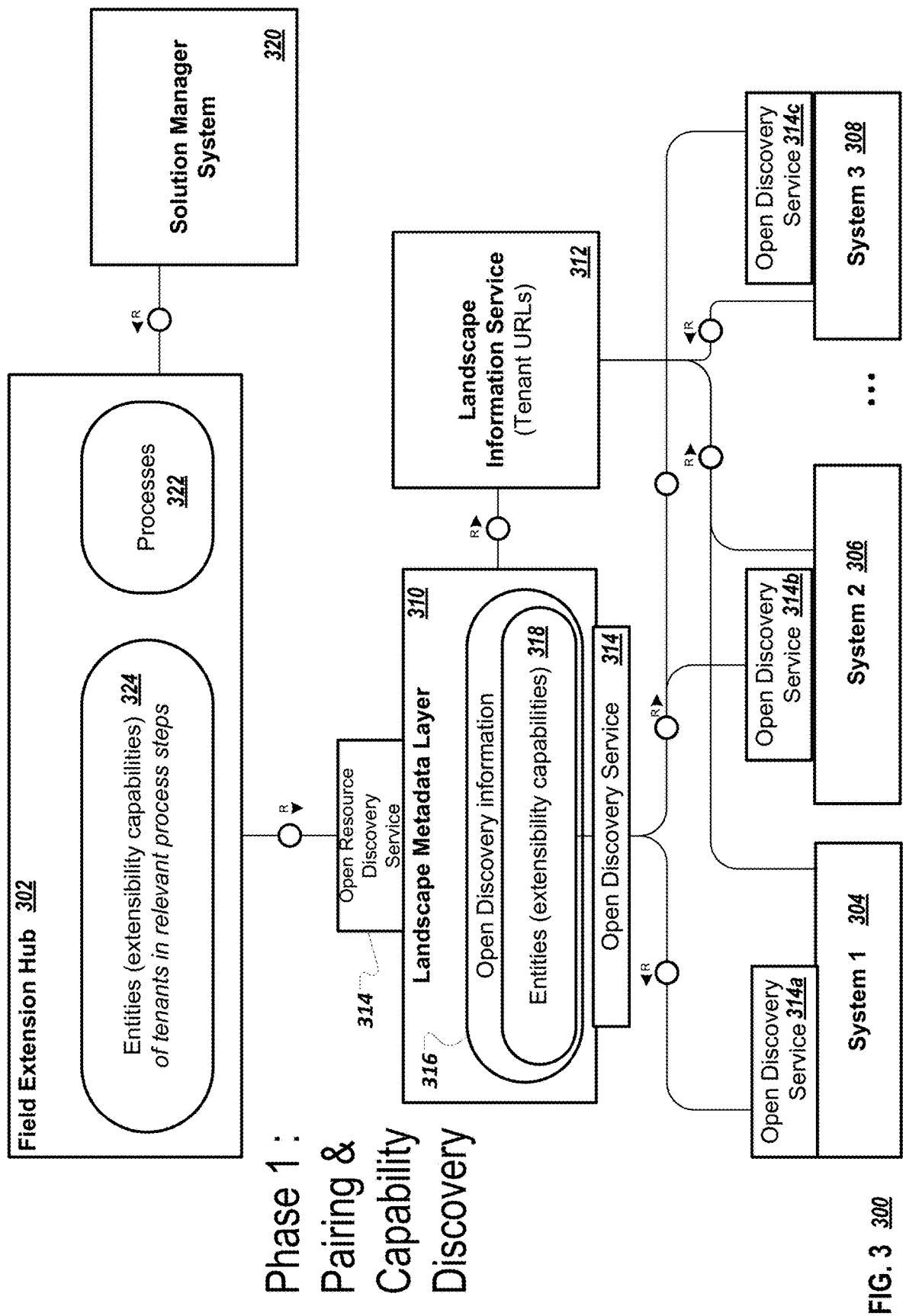
FIG. 3 is a block diagram illustrating an example system for a first phase of pairing and capability discovery.

FIG. 3 is a block diagram illustrating an example system 300 for a first phase of pairing and capability discovery. With the system 300, a field extension hub 302 can become aware of relevant tenants and tenant extensibility capabilities. For example, the field extension hub 302 can become aware of a first system tenant 304, a second system tenant 306, and a third system tenant 308, and respective system tenant extensibility capabilities. The system tenants in the landscape can be configured to handle events from the field extension hub 302 (e.g., the first system tenant 304, the second system tenant 306, and the third system tenant 308 can become paired with the field extension hub 302).

A landscape metadata layer 310 can obtain landscape information and extensibility capabilities for a customer landscape. For instance, the landscape metadata layer 310 can use a landscape information service 312 and an open resource discovery service 314 to retrieve extensibility information from tenants in the landscape, including, for example, from the first system tenant 304, the second system tenant 306, and the third system tenant 308. The landscape information service 312 can provide tenant Uniform Resource Locators (URLs) of landscape tenants to the landscape metadata layer 310. The landscape metadata layer 310 can use the tenant URLs and the open resource discovery service 314 to query system tenants for extensibility capabilities.

The open resource discovery service 314 can be used to obtain open discovery information 316 from the system tenants. The open discovery information 316 can include information about supported APIs (Application Programming Interfaces) and events of each tenant. The open resource discovery service 314 can be adjusted to also retrieve extensibility information 318 from the system tenants.

The system tenants can each provide an implementation of the resource open discovery service 314 (e.g., shown as open resource discovery service implementations 314a, 314b, and 314c) to publish information about their supported events and APIs. The open resource discovery service implementations 314a, 314b, and 314c can capture information about extension capabilities of data objects used in the respective system tenants.

Entity information can include an entity title, entity description, version information, attribute information, and relationship information about relationships with other entities. Extensibility information can include information about current state related to extensibility capability, exposable fields, local extensibility capabilities, and simulation functions. Simulation functions can include logic that can be executed by the field extension hub 302 when a system tenant is offline, to determine whether an extension field could be generated by the system tenant if the system tenant was online. To support a scenario of connecting an extension field to an existing field, system tenants can provide information about exposable fields (e.g., fields the system tenant can potentially expose) to the field extension hub 302 (e.g., via the landscape metadata layer 310). Current state information can include information regarding remaining storage amounts in areas used for extensibility, or a number used out of a number of available extension fields, for given entities or the system tenant in general.

The field extension hub 302 can rely on system tenants for field extension adoption and generation. The field extension hub 302 can obtain local (e.g., tenant-specific) extensibility capabilities to determine which system tenants can support fields having certain features. Accordingly, the field extension hub 302 can support extending fields to respective systems based on local capabilities, rather than just on a minimal overlap of capability of all system tenants.

Accordingly, system tenants can provide local capability information to the field extension hub 302 that describes which features are supported by the system tenant, such as a set of supported data types. Respective system tenants providing specific local capability information can enable a particular entity in a given system tenant with certain features to take part in an integrated extensibility experience when its supported scope is met (e.g., when an extensibility requirement includes an extension field with a type supported by the particular entity). For example, a date field could be added to an entity that provides capability information that mentions a date type in a set of supported types. Furthermore, system tenant(s) can take part in field extension on other entities (other than the particular entity) that may have a richer feature set.

In general, extensibility capabilities can depend on technology, framework and architecture choices there were or are made when implementing a certain entity. For example, an employee entity in the first system tenant 304 may only be extendable by a predefined fixed number of extension fields, based on technologies used to implement the entity. Other entities developed for the first system tenant 304 may have been developed with different technology that uses a different underlying extension mechanism that may allow a flexible (and for example, larger) number of extension fields. Further, the second system tenant 306 and the system tenant 308 may use different technologies for extension fields than the first system tenant 304. Therefore each system tenant can determine, for each entity, if and how the entity is extensible, and include entity-specific extensibility capability information in extensibility information 318 that is provided to the landscape metadata layer 310. Entity-specific extensibility capability information can be stored as or in a substructure to an entity, for example.

The landscape metadata layer 310 can cache the open discovery information 316, so that the open discovery information 316 is available even if a given system tenant is offline. The landscape metadata layer 310 can also know or determine which system tenants are active in which process steps. Accordingly, the open discovery information 316 can include information from system tenants organized according to process identifiers. The landscape metadata layer 310 can also organize extensibility information according to semantically corresponding entities. For instance, the first system tenant 304 may use an Employee entity whereas the second system tenant 306 may use a WorkforcePerson entity, with the WorkforcePerson entity semantically corresponding to the Employee entity.

As mentioned, the service provider can enable customers to easily add logic or validations specific to the customer's processes. For example, a customer may want or need to add an additional field in one or more system solutions involved in a process flow of the customer. The customer can, such as in a pre-implementation consultation with the service provider, internal consultants, and/or partner consultants, determine that a standard product is not sufficient for a customer requirement. As an example, the customer may choose, after determining that the standard solution(s) are not sufficient for the customer requirement, to create an extensibility requirement, for example, using a solution manager system 320 for "Create Workforce Person" and "Replicate Workforce Person" process steps stating that an extension field of "service cost level" is to be introduced for an entity WorkforcePerson. The solution manager system 320 can navigate the customer user to a user interface of the field extension hub 302, for example, for triggering implementation of the extensibility requirement. In addition, the solution manager system 320 can provide process identifiers 322 of processes involved in the extensibility requirement to the field extension hub 302.

The field extension hub 302 can provide the process identifiers 322 of the involved process(es) to the landscape metadata layer 310, to query to the landscape metadata layer 310 for extensibility capabilities of system tenants that are involved in the process step(s) that are relevant to the extensibility requirement. The field extension hub 302 can obtain, from the landscape metadata layer 310, requirement-relevant extensibility information 324, for entities for relevant tenants that are involved in the relevant process step(s). Based on the relevant tenants included in the requirement-relevant extensibility information 324, the field extension hub 302 can pair with each relevant system tenant, to enable each relevant system tenant to receive event information during a later extension field generation stage.

Figure 4:
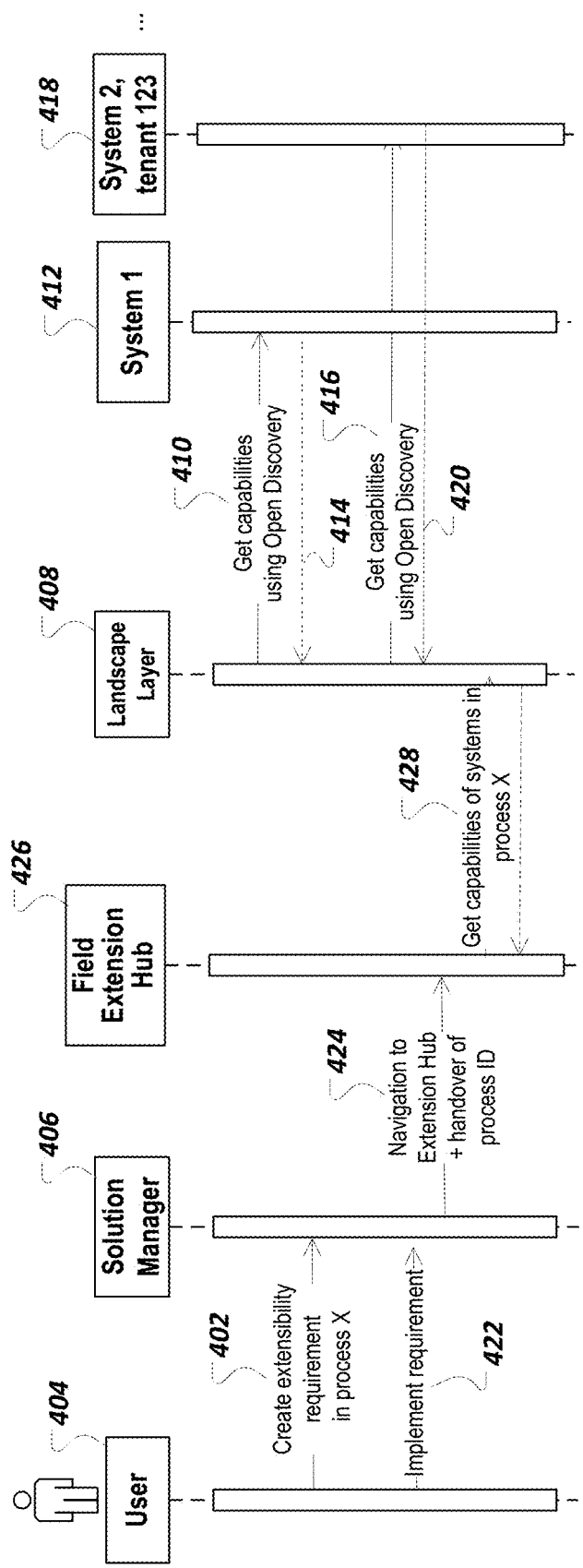
FIG. 4 is a swim lane diagram of an example process for pairing and capability discovery.

FIG. 4 is a swim lane diagram of an example process 400 for pairing and capability discovery. At 402, a customer user 404 creates an extensibility requirement for a process X in a solution manager application 406.

As part of an upfront (and, for example, ongoing process), a landscape layer 408 sends a request 410 to a first system 412 for extension capability information for the first system 412. At 414, the landscape layer 408 receives capability information from the first system 412. Similarly, the landscape layer 408 sends a request 416 to a tenant "123" of a second system 418 for extension capability information for the "123" tenant of the second system 418. At 420, the landscape layer 408 receives capability information from the second system 418. The landscape layer 408 can likewise receive extension capability information from other systems in the landscape.

At 422, the customer user 404 implements the extensibility requirement using the solution manager 406. At 424, the solution manager 406 can provide a process identifier for the process X to a field extension hub 426. At 428, the field extension hub 426 can request and receive extension capability information from the landscape layer 408 for systems (e.g., the first system 412 and the second system 418) that participate in the process X. The field extension hub 426 can pair with the first system 412 and the second system 418, to enable the first system 412 and the second 418 to receive subsequent events from the field extension hub for field generation. Each system tenant can implement event handling capability so as to be able to respond to events from the field extension hub 426.

Figure 5:
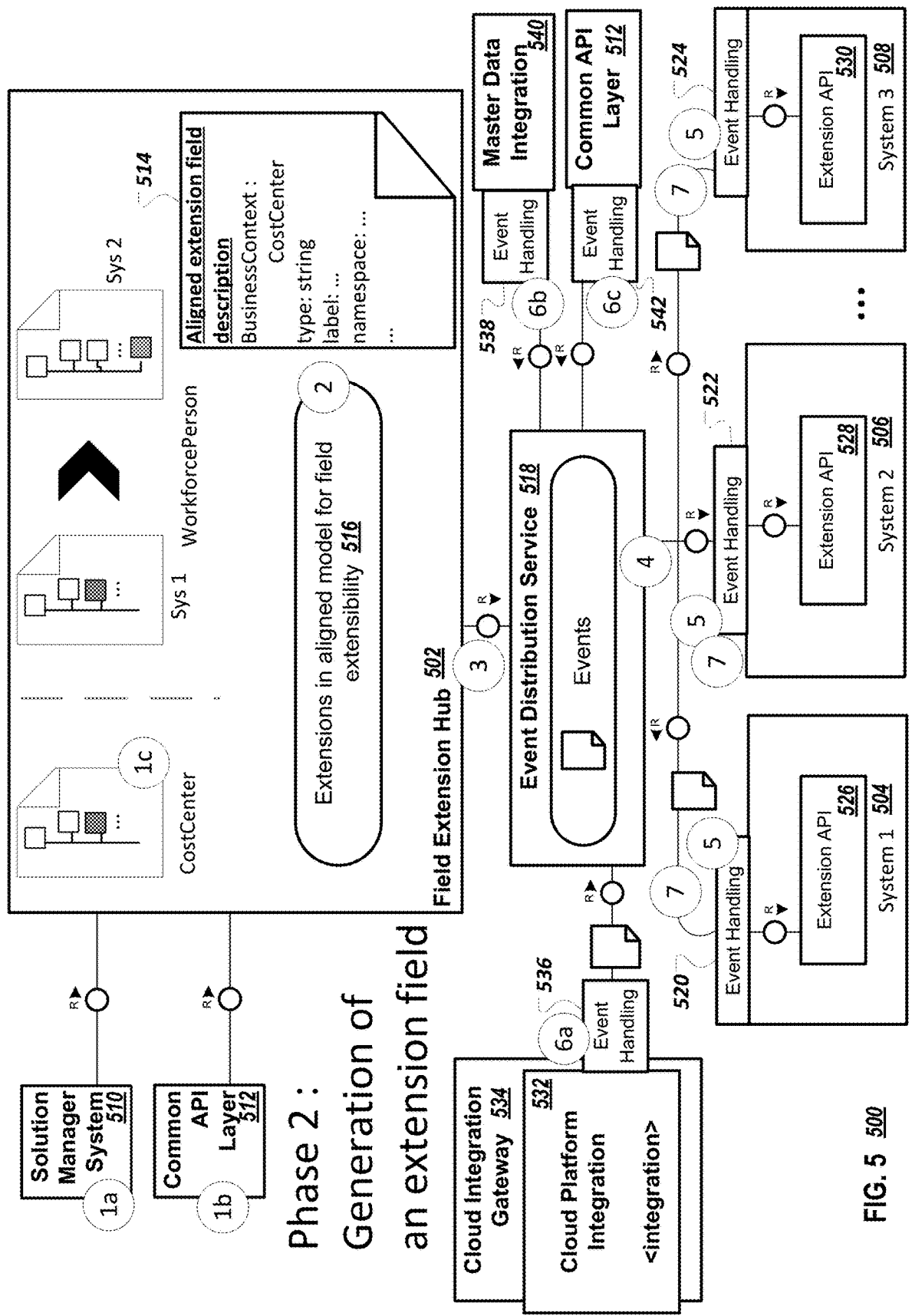
FIG. 5 is a block diagram illustrating an example system for a second phase of generation of an extension field.

FIG. 5 is a block diagram illustrating an example system 500 for a second phase of generation of an extension field. A field extension hub 502 can allow a user to define a desired field, characteristics and values of the field, mapping information, etc. The extension field can be generated across system tenants (e.g., a first system tenant 504, a second system tenant 506, and a third system tenant 508) that are relevant to process steps related to an extension requirement. Additionally, integration content that integrates different system tenants can be automatically updated.

In step 1a, and as described above, a solution manager system 510 can provide a process identifier of process(es) related to an extensibility requirement to the field extension hub 502. For example, the solution manager system 510 can provide the process identifier(s) after a user has defined the extensibility requirement in the solution manager system 510. As another example and as shown in step 1b, the field extension hub 502 can receive a request to create an extension field from an API that has been exposed by the field extension hub. 502 The API can be made available in a common API layer 512, or can otherwise be accessed by an application executed by a customer, partner, or service provider user.

In step 1c, the user can use a user interface of the field extension hub 502 to define an extension field, including specifying a desired state and characteristics of the extension field. Different system tenants can use different names for semantically identical objects. The service provider provides, maintains, or identifies a common domain model that includes common names for corresponding objects or entities and properties that are shared among corresponding objects or entities. The extensibility requirement can correspond to an extension of a common domain model entity. The field extension hub can provide extension field information to the system tenants using the common domain model.

In further detail, the field extension can be defined using an aligned extension field description 514. The aligned extension field description 514 can be expressed using the common domain model and can be a determined least common denominator for defining extension field information that may be understood by each of the different types of system tenants in the customer landscape. The aligned extension field description 514 can use a common scheme that can capture how different system tenants typically describe an extension field. The common scheme can correspond to an alignment of multiple, different schemes for defining extension fields used by multiple, different types of system tenants. The aligned extension field description can 514 be for extension fields what the common domain model is for entities—that is, a common model descriptive of extension fields across systems. The aligned extension field description 514 therefore is a data structure describing extension fields that can be understood by each system tenant in the landscape, as well as by middleware components that integrate various systems.

Figure 6:
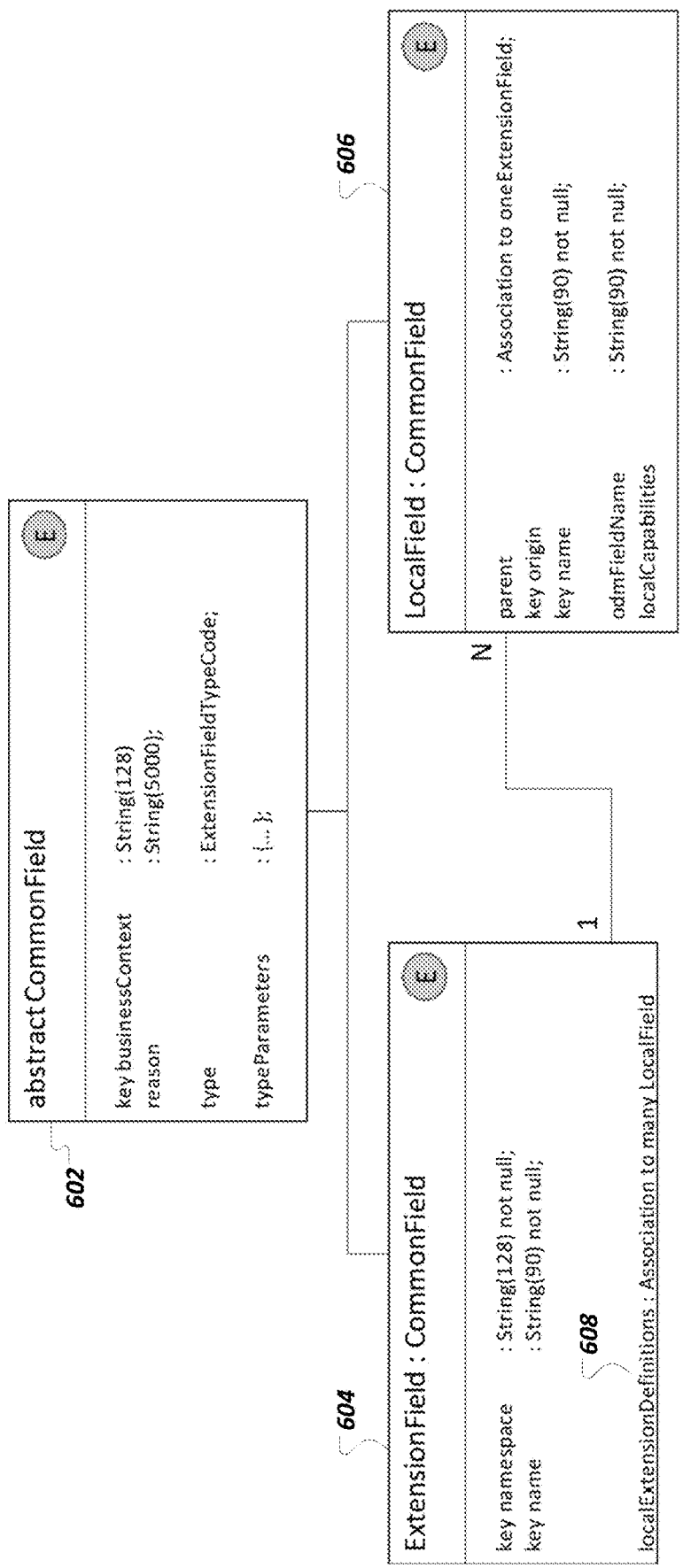
FIG. 6 illustrates an example entity diagram for describing extension fields across systems.

FIG. 6 illustrates an example entity diagram 600 for describing extension fields across systems. An abstract entity "abstractCommonField" 602 represents commonality between an "ExtensionField" entity 604 and a "LocalField" entity 606. The ExtensionField entity 604 represents the common scheme for describing extension fields across system tenant solutions. The LocalField entity 606 represents tenant-internal standard and extension fields. The LocalField entity 606 can be linked to an extension fields based on one or more common domain model entities.

As an example, suppose a customer would like to extend a common domain model entity WorkforcePerson by a field "serviceCostLevel" both in a first system tenant and a second system tenant. A first system tenant field COST_LEVEL can correspond to a first instance of Local- Field. A second system tenant field "customString3" can correspond to a second instance of LocalField. The first and second instances of LocalField can be returned to the field extension hub by the open discovery service. In a field creation process, an instance of ExtensionField can be created with a context of WorkforcePerson for representing an extension in the common domain model. An association "localExtensionDefinitions" 608 in the ExtensionField instance can represent relationships between the extension field on the WorkforcePerson entity and the two LocalField instances.

Referring again to FIG. 5, in step two, the field extension hub 502 can identify the process step(s) (e.g., based on process identifier(s) received from the solution manger system 510) of processes that are relevant for the extensibility requirement. For instance, the defined extension field may be relevant in certain process steps used by certain relevant system tenants in the landscape. Accordingly, the field extension hub 502 can determine to send extension model information 516 in an aligned extension field description 514 format, to the relevant system tenants.

In step 3, the field extension hub 502 can propagate the extension model information 516 to an event distribution service 518, for distribution to the relevant system tenants. The event distribution service 518 can provide eventing as a central way of communication between the field extension hub 502 and system tenants and other components. Eventing can provide decoupling of the field extension hub 502 and other components in a heterogeneous cloud environment, for example. The event distribution service 518 can provide events to system tenants and other components, even when systems or components are not always available.

In step 4, the event distribution service 518 can provide a schema change event to system tenants and integration components in the landscape. The schema change event can correspond to an extension field creation, update, or deletion event. An update event can be sent for extension field parameters that may be modified after creation. A deletion event can be sent if an extension field is deleted, to those system tenants that support deletion of extension fields. When an extension field is initially defined, create events can be sent to system tenants and can instruct receiving system tenants to generate an extension field based on a payload of the create event. The event payload can represent a "to-be" state describing a desired extension fields by means of aligned extension field description 516 information.

In step 5, the first system tenant 504, the second system tenant 506, and the third system tenant 508 receive event information from the event distribution service 518 using event handling components 520, 522, and 524, respectively. Event information can be received asynchronously from the event distribution service 518, for example. The event handling components 520, 522, and 524 implement event listening for listening for and responding to schema change events, including addition, modification, or deletion of extension fields. The event handling components 520, 522, and 524 can invoke internal extension APIs 526, 528, or 530, respectively, to process schema change events.

As mentioned, for create events, an event payload can include "to-be" state expressed by aligned extension field description 514 information. The respective extension API 526, 528, or 530 can realize the "to-be" state by creating an appropriate extension field in the respective system tenant. Each system tenant can respond to the creation event by returning a status code (e.g., success, error), and upon success, a technical name (and/or other parameters) of the created extension field.

In step 6a, one or more integration components, such as a cloud platform integration component 532 and/or a cloud integration gateway component 534, receive events from the event distribution service 518, for example, using an event handling component 536 or another event handling component. Integration components can create mapping(s) between system tenants based on information in received mapping event(s). For example, if a new extension field is to be exchanged between the first system tenant 504 and the second system tenant 506, corresponding integration flow objects can be automatically enhanced to incorporate the new extension field in an extension field mapping. Mapping(s) can be created based on technical information that respective system tenants return to the field extension hub 502 (via the event distribution service 518) in response to creation of extension fields in the respective system tenants. Mapping events sent to the integration components can include the technical information received by the field extension hub 502.

In step 6b, an event handling component 538 of a master data integration component 540 receives schema change events, such as an addition of an extension field. The master data integration component 540 can enhance or adjust the common domain model to add the new extension field to the common domain model. The common domain model can be enhanced so that upstream services (e.g. the common API layer 512) receive the enhanced domain model.

For example, in step 6c, an event handling component 542 of the common API layer 512 can receive event information about a new extension field from the event distribution service 518. The common API layer 512 can include items that are independent of process steps identified by the solution manger system 510. Accordingly, in some implementations, the user of the field extension hub 502 can select the common API layer 512 as a recipient of event information. In other implementations, the common API layer 512 can be a default receiver of event information (e.g., without needing to be explicitly selected as an event receiver). Event information received by the common API layer 512 may indicate that an extension field has been added to a particular system tenant from which the common API layer 512 receives common domain model information. In response to receiving event information about a new extension field, the common API layer 512 can update relevant public APIs to include the extension field. The relevant public APIs can be determined based on extension field mapping information from a received extension field mapping event. Mapping events can be generated and sent in step 7.

In step 7, the field extension hub 502 gathers and aggregates information received from extension field creation by the various system tenants and integration components. The field extension hub 502 can send out mapping events after the field extension hub 502 has determined that the extension field has been successfully created in all relevant system tenants and integration components. For instance, the first system tenant 504, the second system tenant 506, and the third system tenant 508 can receive a mapping event. A respective mapping event instructs a respective receiving system tenant to establish a mapping after extension field creation. The mapping event includes information that can be used by the respective system tenant (or integration component) for establishing a mapping between a locally-created extension field and an extension field in the common domain model.

Figure 7A:
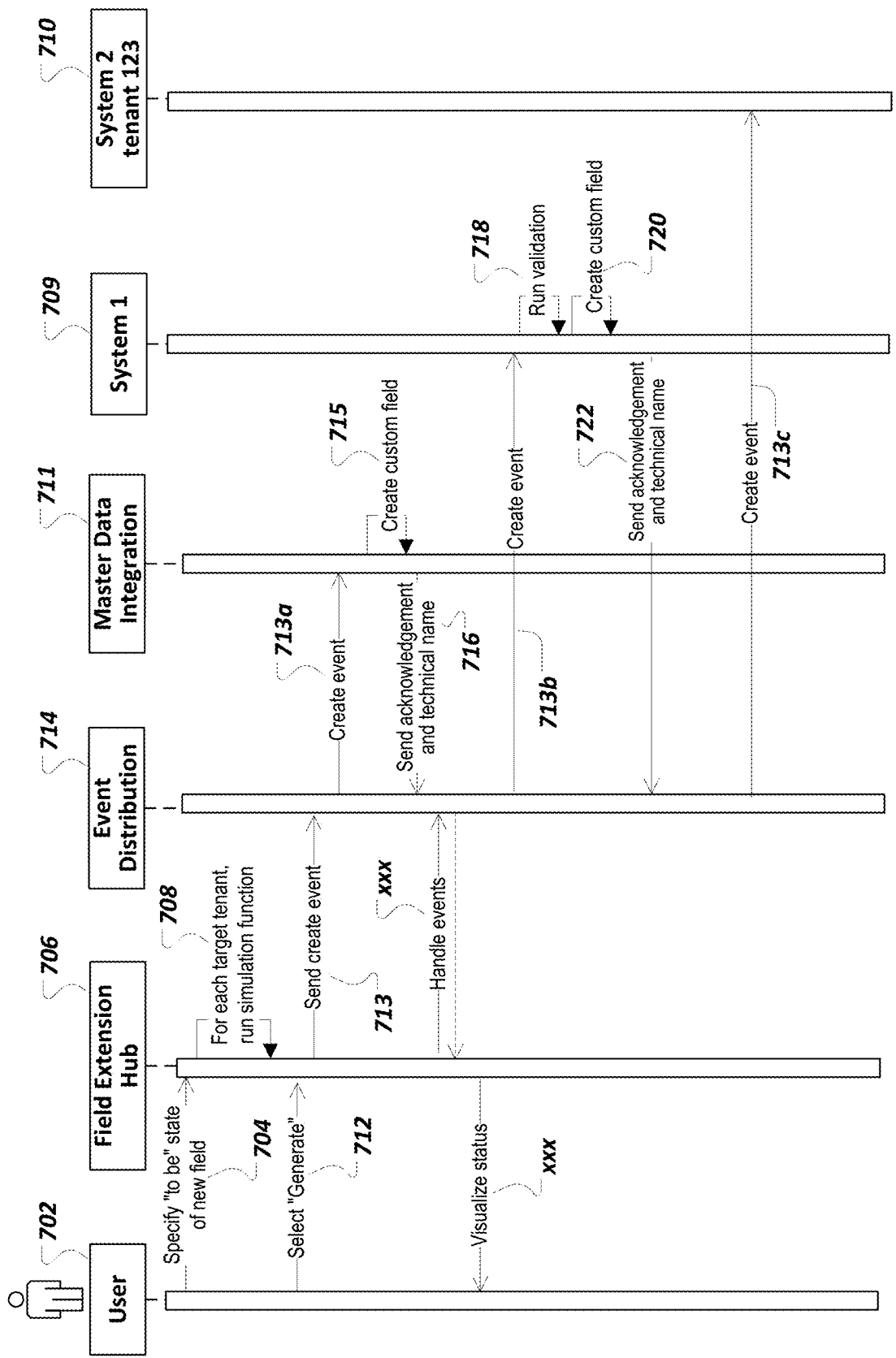

FIGS. 7A-7B illustrate a swim lane diagram of an example process 700 for creating an extension field. A customer user 702 specifies, using one or more inputs 704 to a field extension hub 706, a "to-be" state of a new field. The to-be state of the new field corresponds to the aligned extension field description described above. At 708, the field extension hub 706 runs a simulation function for each target tenant. For example, a first system tenant 709 and a second system tenant 710 can be target tenants. As another example, a middleware master data integration component 711 that connects the first system tenant 709 and the second system tenant 710 can be a target tenant.

Each simulation function can include logic that can be performed to determine whether an extension field could be generated by the respective system tenant. If the simulation functions each return a success value, the user can provide an input 712 to the field extension hub 706 for a new extension field to be generated. In response to the input 712, the field extension hub 706 sends a create event 713 to an event distribution service 714.

The event distribution service 714 can send create events 713a, 713b, and 713c to the middleware master data integration component 711, the first system tenant 709, and the second system tenant 710, respectively. At 715, in response to the create event 713a, the middleware master data integration component 711 can create a custom field. At 716, the middleware master data integration component 711 can respond to the create event 713a with a technical name of the created field. At 718 and 720, in response to the create event 713b, the first system tenant 709 can perform a validation and create a custom field (e.g., upon successful validation), respectively. At 722, the first system tenant 709 can respond to the create event 713b with a technical name of the created field.

Referring now to FIG. 7B, at 724 and in response to the create event 713c, the second system tenant 710 can perform a validation function. The validation function may determine, for example, that a custom string (e.g., "customstring3") that was to be used as a name for a new custom field has been taken and reserved by another process before the second system tenant 710 was able to create the custom field using the custom string name. Accordingly, the second system tenant 710 can send a response 726 to the event distribution service 714 that indicates that the custom field can't be created using the "customstring3" name.

At 728, the event distribution service 714 can forward information from the response 726 to the field extension hub 706, to inform the field extension hub 706 that the second system tenant 710 was unable to create a custom field using the "customstring3" name. The field extension hub 706 can enable the user 702, at 730, to visualize status about the field generation request, including status related to the response 726. The user 702 can, accordingly, be informed that "customstring3" is no longer available on the second system tenant 710 and can provide a new name 732 for the custom field to the field extension hub 706.

The field extension hub 706 can send a follow-up create event 734 targeted for the second system tenant 710 to the event distribution service 714. At 736, the event distribution service 714 can forward the follow-up create event to the second system tenant 710.

At 738, the second system tenant 710 can perform a validation function, for example, to validate the new name 732. At 740, in response to the validation function returning a result that indicates that the new name 732 is acceptable, the second system tenant 710 can create a custom field using the new name 732. At 742, the second system tenant 710 can respond to the follow-up create event by providing a technical name used for the custom field creation. At 744, the event distribution service 714 can send a success status to the field extension hub 706. At 746, the field extension hub 706 displays the success status to the user 702, for instance in a user interface of the field extension hub 706. Example user interfaces for triggering creation of a custom field and visualizing status information related to creation of the custom field are presented below with respect to FIG. 9-16.

After successful creation of each of the custom fields in each of the target tenants, the field extension hub 706 can be aware of all the technical names used for the newly-created fields. Accordingly, at 748, the field extension hub 706 sends a mapping event to the event distribution service 714. The mapping event can include information that can be used by each tenant to establish a mapping between a local extension field and corresponding field(s) in systems that are connected to the respective tenant. For example, the event distribution service 714 can send mapping events 750a and 750b to the first system tenant 709 and the second system tenant 710, respectively. At 754 and 756, the first system tenant 709 can establish a mapping and respond to the mapping event 750a, respectively. At 758 and 760, the second system tenant 710 can establish a mapping and respond to the mapping event 750b, respectively.

Figure 8:
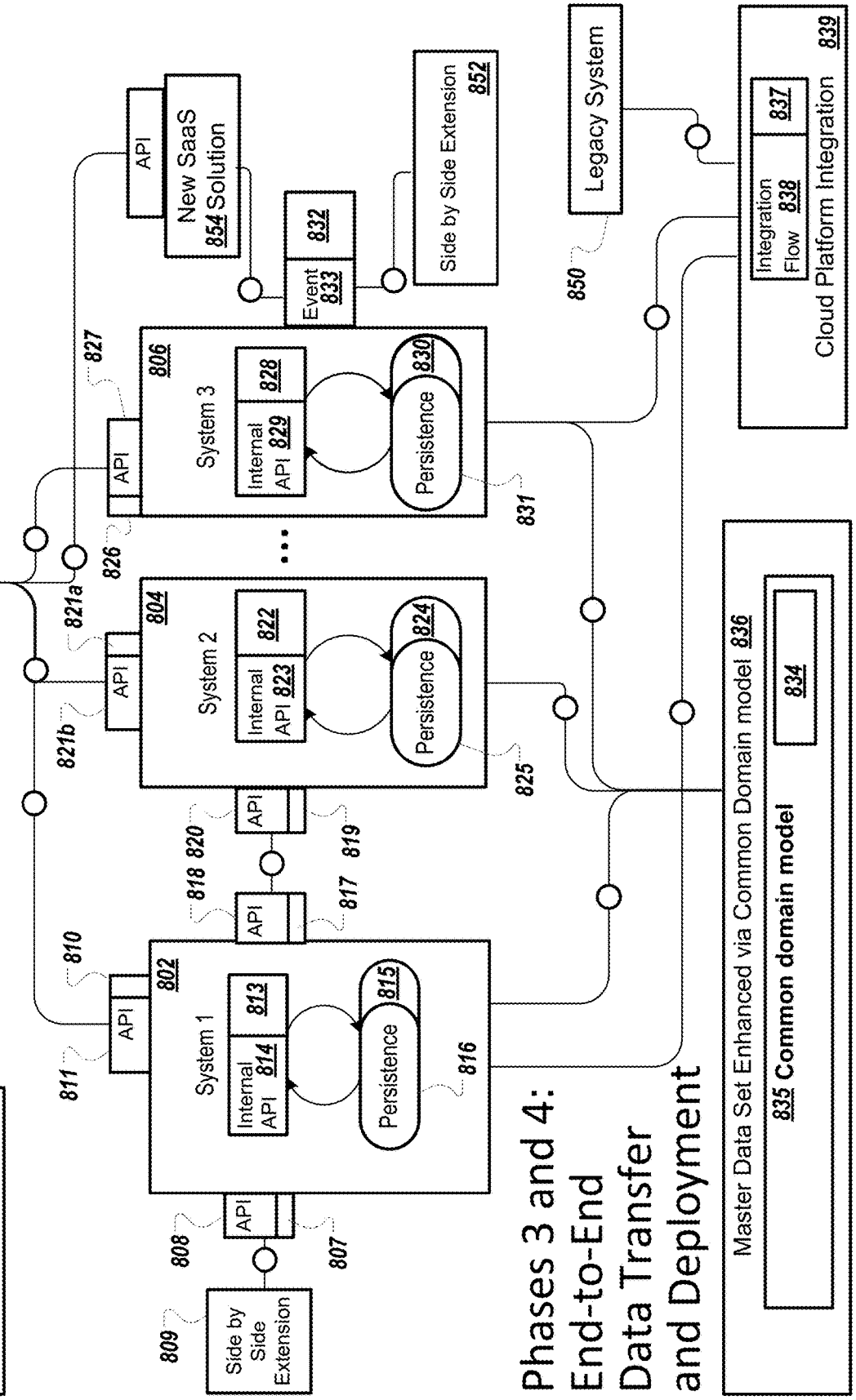
FIG. 8 illustrates an example system that shows a resulting landscape state after system tenants have responded to events from the field extension hub.

FIG. 8 illustrates an example system 800 that shows a resulting landscape state after system tenants have responded to events from the field extension hub. The system 800 corresponds to a third phase of end-to-end data transfer and a fourth phase of deployment. Each of a first system tenant 802, a second system tenant 804, and a third system tenant 806 may have performed various actions in response to event(s) received from the field extension hub, to account for a new extension field, for example. For instance, the first system tenant 802 may have updated (or added) a portion 807 of a publicly-exposed API 808 that is used by at least a customer side-by-side extension 809. Side-by-side extensions can correspond to applications a customer has developed, using a cloud platform, for example. As another example, the first system tenant 802 may have updated (or added) a portion 810 of a publicly-exposed API 811 that is used by at least a common API layer 812. As yet another example, the first system tenant 802 may have updated (or added) a portion 813 of internal API 814 and/or a portion 815 of internal persistence 816. The first system tenant 802 may have also made change(s) to a portion 817 of an API 818 used to communicate with the second system tenant 804.

The second system tenant 804 and the third system tenant 806 may have made similar (e.g., but not necessarily a same type or number) of changes, depending on extensibility implementations in each respective system tenant. For example, the second system tenant 804 may have made change(s) to a portion 819 of an API 820, a portion 821a of an API 821b, a portion 822 of an internal API 823, and/or a portion 824 of internal persistence 825. Similarly, the third system tenant 806 may have made change(s) to a portion 826 of an API 827, a portion 828 of an internal API 829, and/or a portion 830 of internal persistence 831.

Each system tenant may have made change(s) to externally-exposed event(s). For instance, the third system tenant 806 may have changed a portion 832 of one or more event(s) 833. Each change made by a respective system tenant can be performed using extensibility mechanisms already in place at the respective system tenant. Each change performed by a respective system tenant can be performed by the existing extensibility mechanisms to achieve the target state sent in event(s) by the field extension hub.

As mentioned above, various middleware components may have been automatically adjusted as well. For example, a portion 834 of a common domain model 835 of a master data set component 836 may have been updated (or added). As another example, a portion 837 of at least one integration flow 838 of a cloud platform integration component 839 may have been automatically updated or added. Other components, such as the common API layer 812, may have been updated, such as an updating of a portion 840 of one or more mappings 841, updating of API(s) exposed by the common API layer 812, etc.

After each system tenant, middleware component, or other component has made changes in response to field extension hub event(s), end-to-end testing can be performed, in a third phase, to ensure that the addition of the new extension field works seamlessly in the customer landscape. In some implementations, the field extension hub can provide a default value for an extension field. Otherwise, the landscape can be tested without intervention by the field extension hub.

Phase three can be deemed as complete when data transfer with the new extension field has been tested successfully in an end-to-end manner in the landscape. Upon successful completion of phase three, a fourth phase can be performed for deployment of the new extension field and updated integration content into production zones for the customer. For example, after an extension field is created across the system landscape the extension field can be provided for end users to be used in a live production environment. In some cases, a customer's extensibility project might not just include an extension field but may also include validation logic or a side-by-side application. The field extension hub can integrate or interface with various transport/lifecycle tools so that the transport tools can ensure that corresponding artifacts are deployed together.

Once deployed, various components of the landscape can use the new extension field. For example and as mentioned, the side-by-side extension 809 can use the API 808 that has been enhanced to incorporate the new extension field. As another example, a legacy system 850 may integrate with one or more of the system tenants using an updated integration flow of the cloud platform integration component 839. A side-by-side extension 852 and/or a new SaaS (Software as a Service) system 854 may consume the event 833 that has been enhanced with the new extension field. As another example, a side-by-side extension 856 can use an API of the common API layer 812 that has been enhanced with the new extension field.

The field extension hub can provide various types of user interfaces. In the following example user interfaces, an example scenario is described for adding a new extension field for storing pilot license information for employee users, for those users who have a pilot license. A given customer may wish to add the pilot license extension field as a new field to various systems in the customer landscape. None of the system tenants may currently support the pilot license field, for example. The following user interface figures present example user interfaces that may be used in the second phase of generation of an extension field, for example. For the following figures, references to a One Domain Model (ODM) correspond to the common domain model described above.

Figure 9:
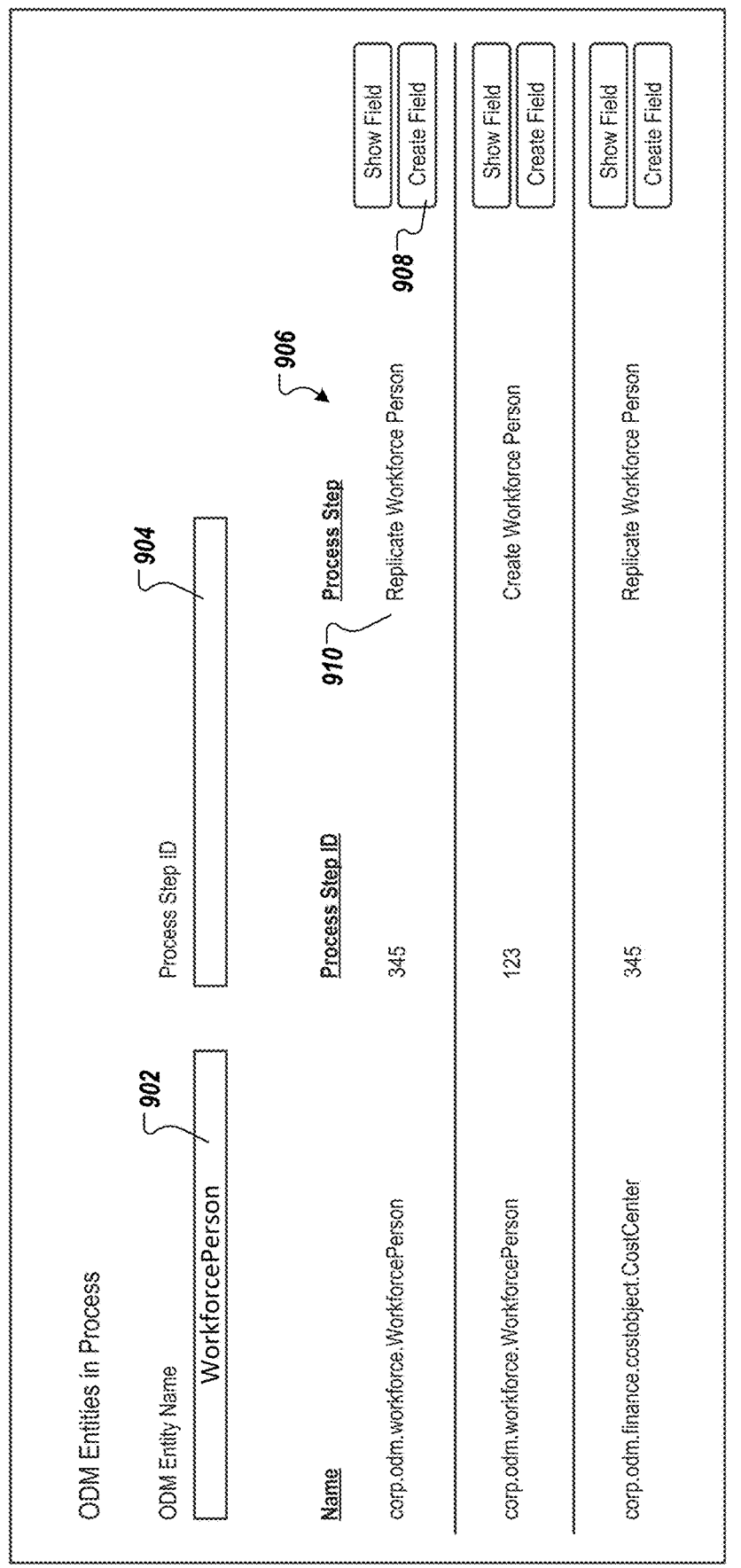
FIG. 9 illustrates an example entity-in-processes user interface.

FIG. 9 illustrates an example entity-in-processes user interface 900. The user can use an entity name filter field 902 and/or a process step filter field 904 to filter entities and/or processes to assist in locating an entity to enhance with an extension field. For example, the user has entered "WorkforcePerson" in the entity name filter field 902. A given entity may participate in one or more process steps and a given process step may involve one or more entities. Objects and entities that are displayed in the user interface 900 can be entities or objects that have been determined to be extendable, based on metadata previously received from system tenants in the landscape. A results area 906 displays information for entities and processes that match provided filter(s). The user can select a create field button 908 to trigger creation of a new field for the WorkForcePerson entity for a Replicate WorkforcePerson process step 910.

FIG. 10 illustrates an example entity user interface 1000. A customer user may know that a job details node of a WorkforcePerson entity may be an appropriate place to store a pilot license field. The user can view existing fields 1002 of a job details node 1004, using the entity user interface 1000. The entity user interface 1000 can be displayed after a user browses and navigates a domain model that can be presented in response to common domain model information for landscape tenants that has been received by the field extension hub from an open discovery service. As shown, current fields of the job details node do not include a field for storing a pilot license. Accordingly, the user can choose to add a new extension field through use of the field extension hub.

Figure 11:
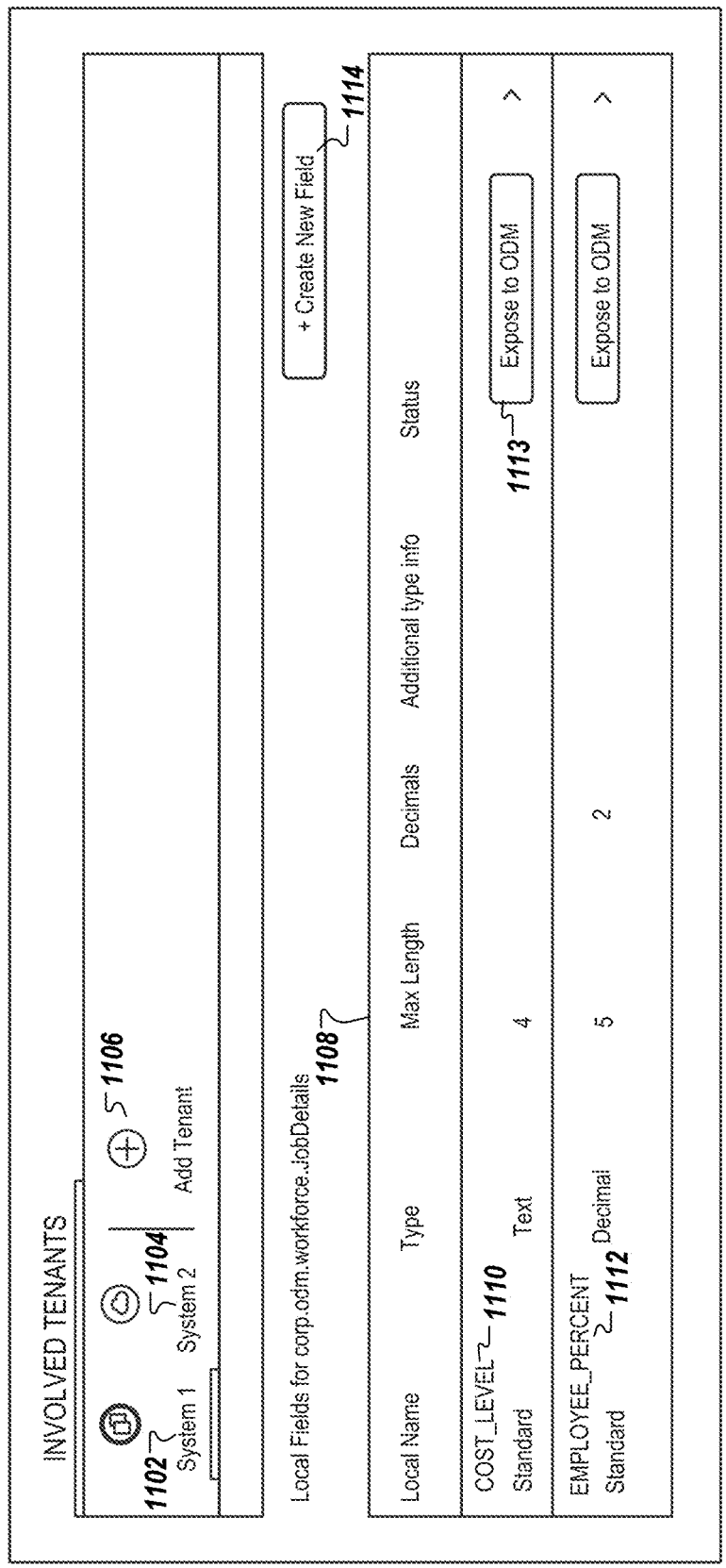
FIG. 11 illustrates an example tenants user interface identifying one or more tenants that utilize a given entity.

FIG. 11 illustrates an example tenants user interface 1100 identifying one or more tenants that utilize a given entity. The tenants user interface 1100 can display system tenants that are configured to use the entity node (e.g., JobDetails of WorkforcePerson) to which the extension field is to be added. For example, a first system tenant 1102 and a second system tenant 1104 are displayed. The user can select a particular system tenant and then select, for example, a remove item to remove the system tenant from involvement in the creation of the extension field. As another example, another system tenant can be added manually by the user in response to selection of an add-tenant control 1106. For example, a third system tenant can be added.

A local fields area 1108 displays local fields for the JobDetails node of the WorkforcePerson entity, for a selected system tenant. For example, a COST_LEVEL local field 1110 and an EMPLOYEE_PERCENT local field 1112 are displayed for the selected first system tenant 1102. As described in more detail below, the user can select an expose button 1113 if the user wants to create a new extension field in one or more other system tenants mapped to an existing field in the selected system tenant. For the new pilot license field scenario of creating a new field across all system tenants, the user can select a create new field button 1114 to trigger creation of a new extension field.

Figure 12:
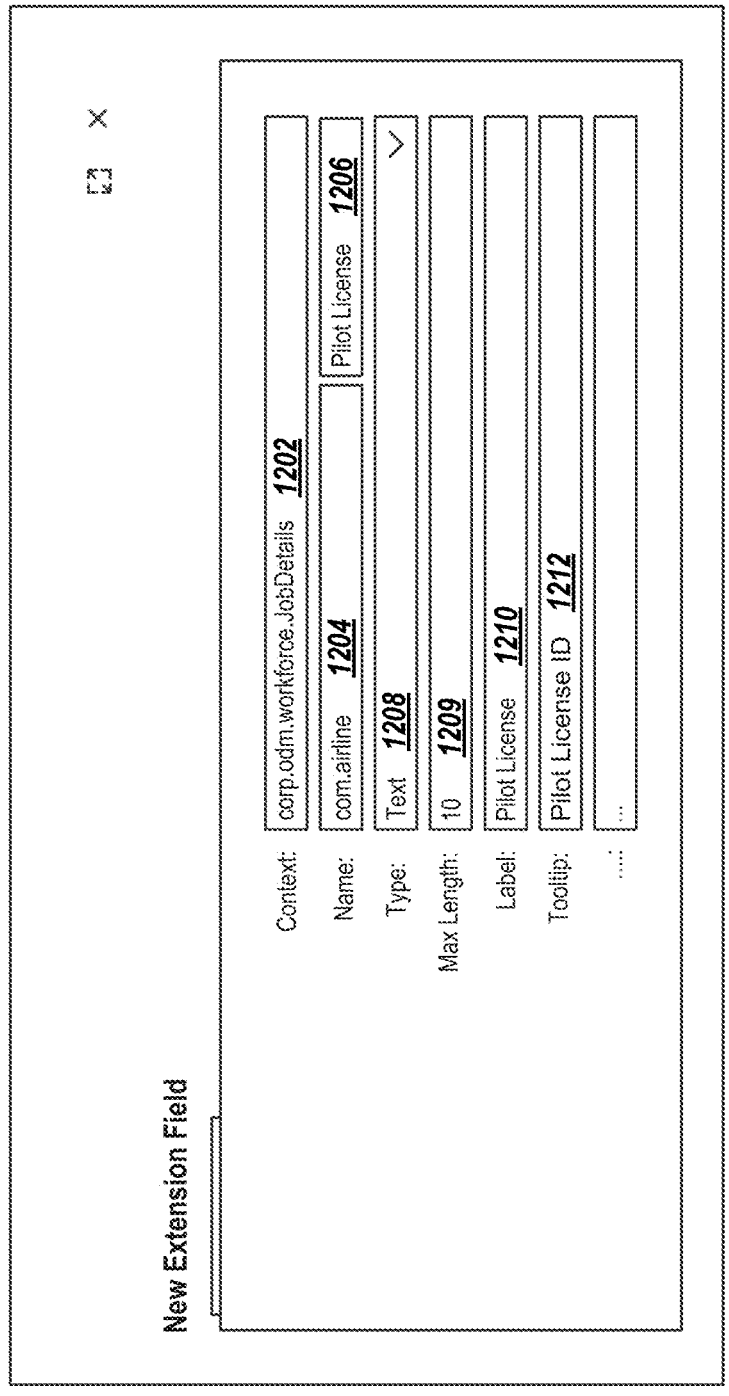
FIG. 12 illustrates an example new-field user interface.

FIG. 12 illustrates an example new-field user interface 1200. A context value 1202 can be prefilled for the user, to establish a context (e.g., corp.odm.workforce.JobDetails) for the new extension field. A namespace (e.g., com.airline) 1204 can also be prefilled for the user. Namespaces can be used, for example, to provide separation between service provider content, customer content, and partner content.

The user can enter a name (e.g., "Pilot License") for the new extension field using a name text box 1206. A type (e.g., text) and a maximum length of the extension field can be selected using a type selection control 1208 and a maximum length text box 1209, respectively. The type selection control 1208 and the maximum length text box 1209 can enable selection of a type and a field length, respectively. A label and a tooltip can be specified using a label text box 1208 and a tooltip text box 1210, respectively The fields of the new-field user interface 1200 correspond to an aligned extension field description that includes a harmonized set of types across system tenants in the landscape. The fields of the new-field user interface 1200 correspond to the aligned extension field description 514 described above with respect to FIG. 5 and the second phase of extension field generation, for example.

Figure 13:
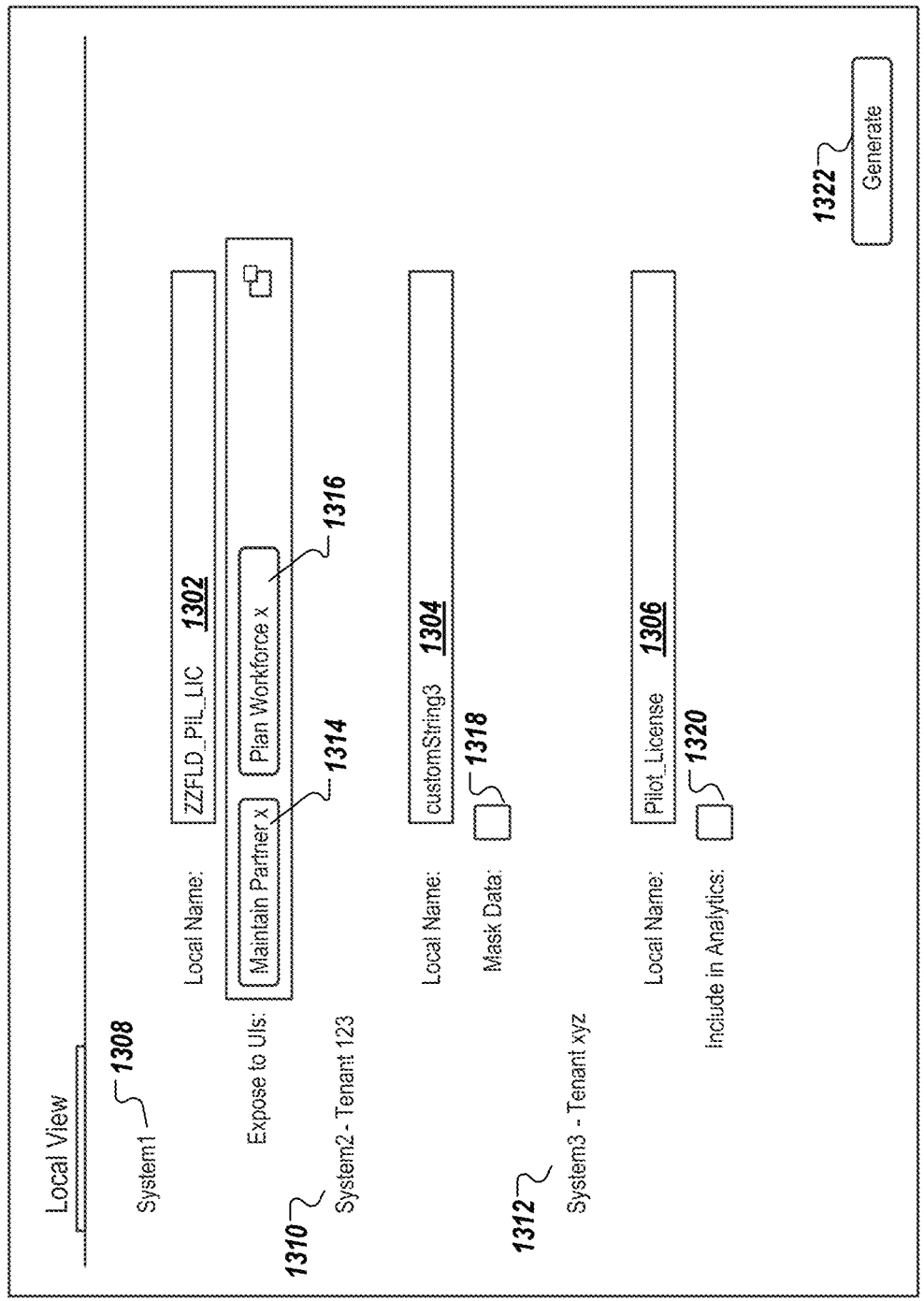
FIG. 13 illustrates an example local tenant information user interface.

FIG. 13 illustrates an example local tenant information user interface 1300. The local tenant information user interface 1300 can be displayed in conjunction with the add new field user interface 1200. Local names 1302, 1304, and 1306 for how the extension field will be named and seen in respective system tenants are displayed for a first system tenant 1308, a second system tenant 1310, and a third system tenant 1312, respectively. Local data names can be selected and used, to enable updating of integration content, for example. The new extension field can be a net new field to the three different systems.

Additionally, for each system tenant, one or more system-specific capabilities may be specified. For example, for the first system tenant 1308, a maintain-partner user interface 1314 and a plan workforce user interface 1316 can be selected as user interfaces to which the new field is exposed. As another example and for the second system tenant 1310, a masking setting 1318 can be applied. As yet another example and for the third system tenant 1312, an include-in-analytics setting 1320 can be applied. Other examples are possible, such as exposing the new field for reporting in one or more systems. System-specific capabilities can be determined based on information received from an open discovery service.

In response to selection of a generate button 1322, an extension model described by the aligned extension field description (e.g., that describes a to-be state for the new extension field) can be provided, in a create event, to the selected system tenants, as described above with respect to FIG. 5. Accordingly, the first system tenant 1308, the second system tenant 1310, and the third system tenant 1312 can each be enhanced with the new field.

FIG. 14 illustrates an example status user interface 1400. The status user interface 1400 can display status information received from system tenants regarding the creation of the extension field in the system tenants. An extension model based on the aligned field extension data structure was sent to each involved system tenant, as a desired state for a new extension field. A status column 1401 displays status values 1402, 1404, and 1406 for a first system tenant 1408, a second system tenant 1410, and a third system tenant 1412, that reflect whether the desired state has been achieved in each respective system tenant.

Each system tenant status has a value of "Done," indicating that the pilot license field has been created successfully in each of the system tenants, using local custom field names 1414, 1416, and 1418, respectively. For example, for the second system tenant 1410, a custom field name "customstring3" has been reserved and used by the second system tenant 1410 for the new extension field.

In addition to creation of the extension field in the involved system tenants, integration middleware can also be enhanced, including updating or creation of mappings used for integration scenarios. For example, a master data service integration component 1420 was updated for updating integration of the first system tenant 1408 with the second system tenant 1410. As another example, a cloud platform integration middleware component 1422 was updated to update integration of the second system tenant 1410 with the third system tenant 1412.

In some cases an extension field can be not net-new in at least some of the involved system tenants. For example, referring again briefly to FIG. 11, in the first system tenant 1102, the COST_LEVEL field 1110 can exist to capture a service cost level (e.g., whether a cost for the employee is a premium due to being, for instance, a premium or union consultant). A similar cost level field might not exist in the second system tenant 1104 or in a common domain model. A cost level extension field can be added so that a cost level field is added to the second system tenant 1104 and mapped to the COST_LEVEL field 1110 in the first system tenant 1102. The user can select the expose button 1113 to expose the COST_LEVEL field 1110 to the common domain model. After being exposed to the common domain model, the cost level extension field can be created.

Figure 15:
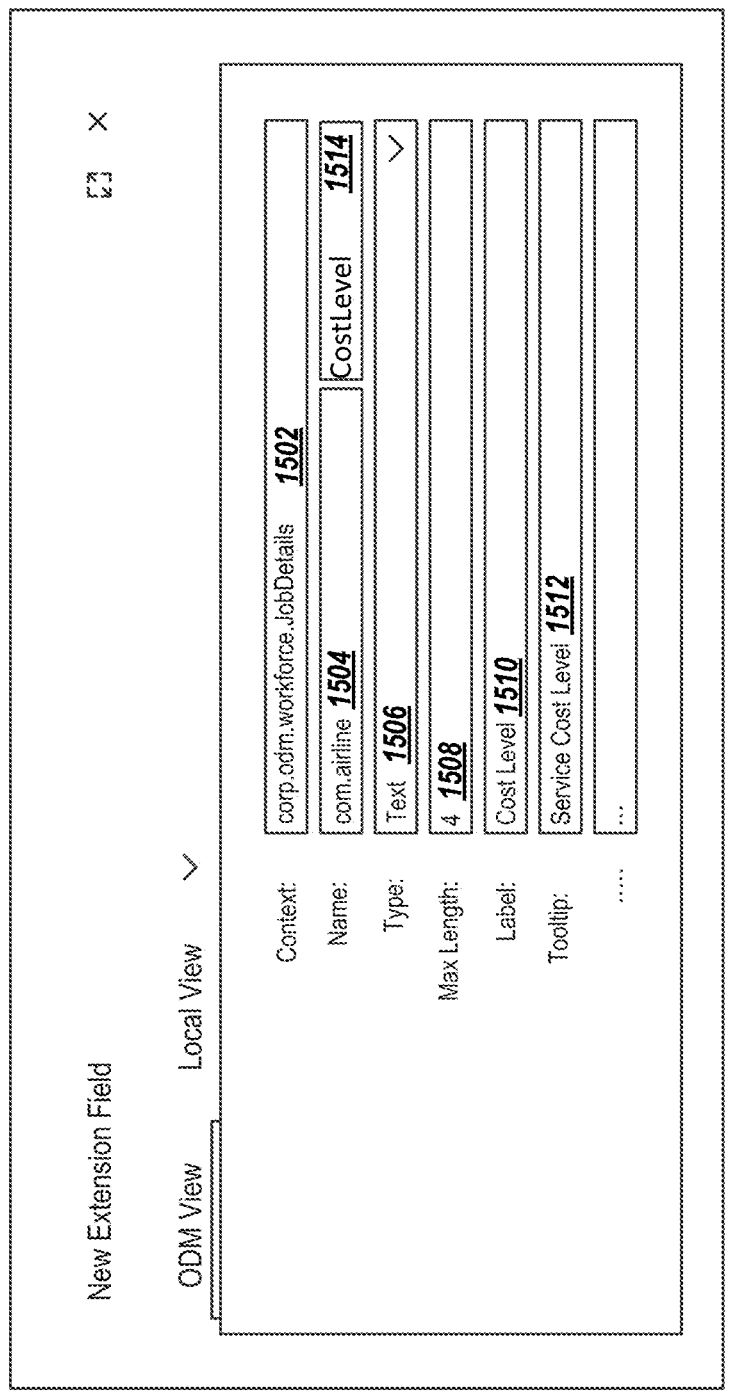
FIG. 15 illustrates an example user interface for creating an extension field based on an existing field.

FIG. 15 illustrates an example user interface 1500 for creating an extension field based on an existing field. The user interface 1500 can be used for adding a new extension field that is mapped to a field that exists in one of the system tenants in the landscape. Context 1502, namespace 1504, type 1506, length 1508, label 1510, and tool tip 1512 values can be pre-filled with corresponding values from the existing field (e.g., the COST_LEVEL field 1110 from FIG. 11). The user can enter a technical name 1514 (e.g., "CostLevel"). The user interface 1500 can be displayed in conjunction with a user interface similar to the local tenant information user interface 1300 for selecting tenants to which to add the new extension field and any local extension capabilities. Other existing field(s) can be selected as to be mapped to the new extension field, if more than one system tenant includes an existing field that corresponds to the new extension field. After the technical name, tenant selection, and local capabilities are provided, the new extension field can be generated and mapped to the existing field.

FIG. 16 illustrates an example status user interface 1600. The status user interface 1600 can display status values for either a successful or failed attempt to add a new field mapped to an existing field. An overall status 1602 indicates that the addition of the new field mapped to the existing field was not successful. A successful status 1604 can indicate that there were no problems with an existing field 1606 of a first system tenant 1607 that was to be used as a basis for the extension field addition. A successful status 1608 can indicate that no problems were detected related to being able to update a middleware component 1610 that integrates the first system tenant 1607 with a second system tenant 1612. An error status 1614 can indicate that an error occurred related to attempting to add a new field 1616 to the second system tenant 1612. For example, the "customString3" field selected in the second system tenant 1612 as an extension field may have been selected and reserved by another process before the addition of the extension field was able to complete. The user can select an analyze button 1618 to analyze what may have caused the error status 1614.

Figure 17:
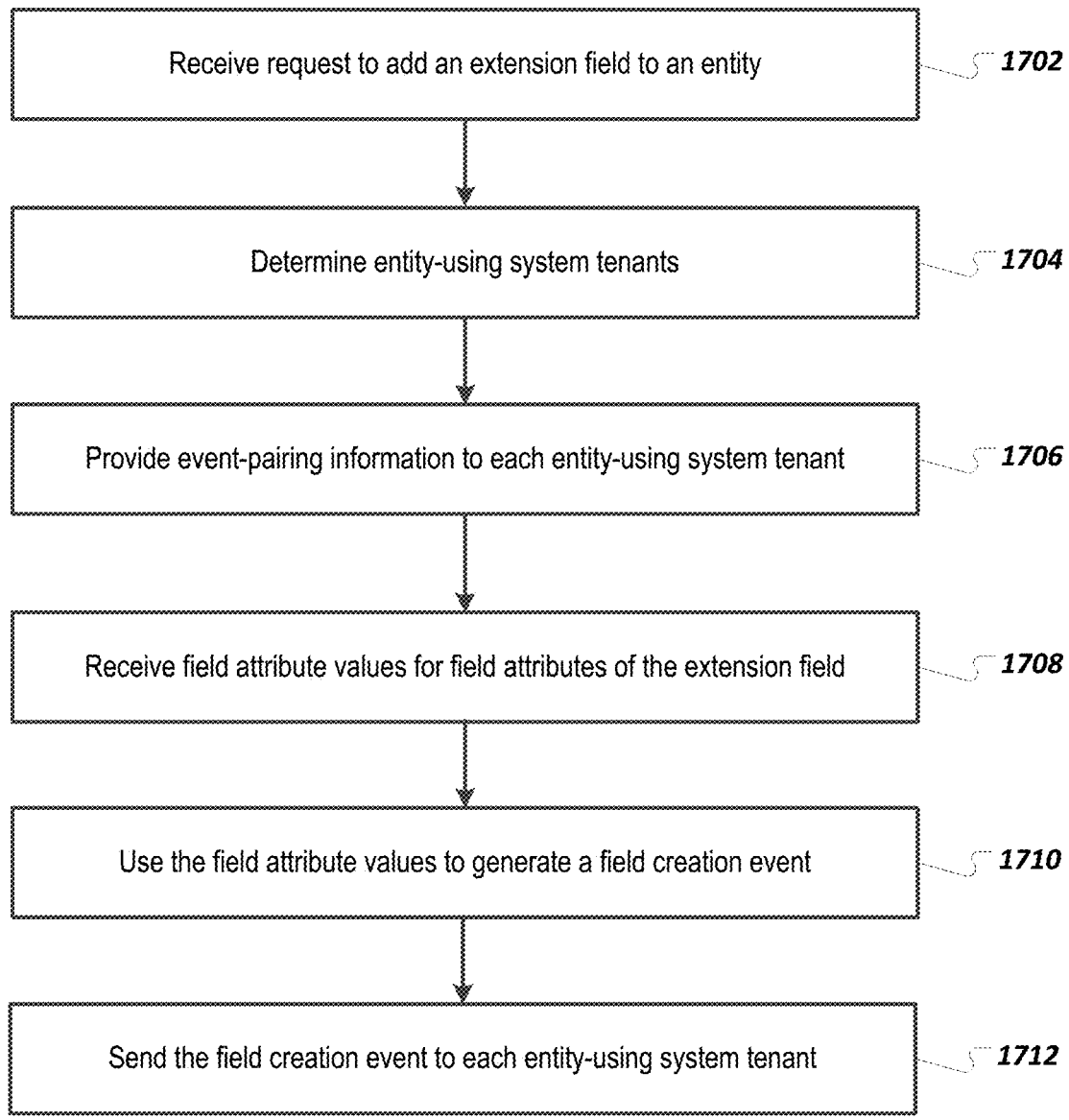
FIG. 17 is a flowchart of an example method for creating an extension field across system tenants in a customer landscape.

FIG. 17 is a flowchart of an example method for creating an extension field across system tenants in a customer landscape. It will be understood that method 1700 and related methods may be performed, for example, by any suitable system, environment, software, and hardware, or a combination of systems, environments, software, and hardware, as appropriate. For example, one or more of a client, a server, or other computing device can be used to execute method 1700 and related methods and obtain any data from the memory of a client, the server, or the other computing device. In some implementations, the method 1700 and related methods are executed by one or more components of the system 100 described above with respect to FIG. 1. For example, the method 1700 and related methods can be executed by the field extension hub 102 of FIG. 1.

At 1702, a request is received to add an extension field to an entity used in a customer landscape. The entity can be a business object or another type of object. The customer landscape includes multiple system tenants of different types of systems. Different systems can be provided by different vendors, in some examples. A process identifier of a selected process in which to create an extensibility requirement can be received. Receiving the request to add an extension field to an entity can include determining that the selected process uses the entity.

At 1704, at least one entity-using system tenant that uses the entity in at least one process is determined, from among the multiple system tenants.

At 1706, event-pairing information is provided to each entity-using system tenant to establish a pairing with each entity-using system tenant to enable each entity-using system tenant to receive extension field events.

At 1708, field attribute values for a set of field attributes for the extension field are received. The field attribute values describe a target state of the extension field. Receiving the field attribute values can include enabling selection of field attribute values for aligned field attributes that have been determined to reflect commonality for describing extension fields in the system tenants in the landscape. The aligned field attributes that have been determined to reflect commonality for describing extension fields can include a context attribute, a namespace attribute, a technical field name, a field data type, a field size, a field label, and a field tool tip.

At 1710, a field creation event is generated, using the received field attribute values. The field creation event instructs a system tenant receiving the field creation event to create a local field that has the target state of the extension field in that system tenant.

At 1712, the field creation event is sent to each entity-using system tenant. In response to receiving the field creation event and creating a respective local field, each respective local field created by a respective entity-using system tenant has the target state of the extension field. In addition to sending the field creation event, one or more integration components can be updated. For example, a first local field of a first entity-using system tenant can be mapped to a second local field of a second entity-using system tenant, with both the first local field and the second local field corresponding to the extension field.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by a field extension hub, the method comprising:

receiving, from a customer, a request to modify a structure of an entity used in a customer landscape by adding an extension field to the entity, wherein the customer landscape includes multiple system tenants of different types of systems, and the extension field is to be added to at least two different systems used by the customer, wherein the at least two different systems are provided by different vendors, and each system of the at least two different systems includes an entity-using system tenant that uses instances of the entity in at least one process;

in response to receiving the request to modify the structure of the entity, determining, from among the multiple system tenants, at least one entity-using system tenant that uses instances of the entity in at least one process;

providing event-pairing information to each entity-using system tenant to enable each entity-using system tenant to receive extension field events;

receiving field attribute values for a set of field attributes for the extension field, wherein the field attribute values describe a target state of the extension field;

generating, using the received field attribute values, a field creation event that instructs entity-using system tenant receiving the field creation event to modify the structure of the entity in that entity-using system tenant by creating a local field that has the target state of the extension field in that entity-using system tenant and adding the local field to the structure of the entity;

sending the field creation event to each entity-using system tenant, wherein each respective local field created by a respective entity-using system tenant and added to the structure of the entity in response to receiving the field creation event has the target state of the extension field; and updating an integration component by updating integration content to map a first local field of a first entity-using system tenant to a second local field of a second entity-using system tenant.

2. The computer-implemented method of claim 1, wherein the entity is a business object.

3. The computer-implemented method of claim 1, further comprising enabling, via a user interface, addition of an additional entity-using system tenant to receive the field creation event.

4. The computer-implemented method of claim 1, wherein at least some of the entity-using system tenants are associated with different vendors.

5. The computer-implemented method of claim 1, further comprising, before receiving the field attribute values, determining extensibility capabilities of each entity-using system tenant.

6. The computer-implemented method of claim 5, further comprising enabling selection of an extensibility capability for a first entity-using system tenant for use by the first entity-using system tenant when creating a first local field in the first entity-using system tenant.

7. The computer-implemented method of claim 1, wherein receiving field attribute values for a set of field attributes for the extension field comprises enabling selection of field attribute values for aligned field attributes that have been determined to reflect commonality for describing extension fields in the entity-using system tenants in the landscape.

8. The computer-implemented method of claim 7, wherein the aligned field attributes that have been determined to reflect commonality for describing extension fields include a context attribute, a namespace attribute, a technical field name, a field data type, a field size, a field label, and a field tool tip.

9. The computer-implemented method of claim 1, further comprising receiving a process identifier of a selected process in which to create an extensibility requirement;
wherein receiving the request to modify the structure of the entity comprises determining that the selected process uses the entity.

10. The computer-implemented method of claim 1, further comprising:
receiving selection of an existing field in a first entity-using system tenant; and
mapping one or more local fields created in one or more other entity-using system tenants to the existing field in the first entity-using system tenant.

11. A system comprising:
one or more computers; and
a non-transitory computer-readable medium coupled to the one or more computers having instructions stored thereon which, when executed by the one or more computers, cause the one or more computers to perform operations via a field extension hub, the operations comprising:
receiving, from a customer, a request to modify a structure of an entity used in a customer landscape by adding an extension field to the entity, wherein the customer landscape includes multiple system tenants of different types of systems, and the extension field is to be added to at least two different systems used by the customer, wherein the at least two different systems are provided by different vendors, and each system of the at least two different systems includes an entity-using system tenant that uses instances of the entity in at least one process;
in response to receiving the request to modify the structure of the entity, determining, from among the multiple system tenants, at least one entity-using system tenant that uses instances of the entity in at least one process;
providing event-pairing information to each entity-using system tenant to enable each entity-using system tenant to receive extension field events;
receiving field attribute values for a set of field attributes for the extension field, wherein the field attribute values describe a target state of the extension field;
generating, using the received field attribute values, a field creation event that instructs an entity-using system tenant receiving the field creation event to modify the structure of the entity in that entity-using system tenant by creating a local field that has the target state of the extension field in that entity-using system tenant and adding the local field to the structure of the entity; and
sending the field creation event to each entity-using system tenant, wherein each respective local field created by a respective entity-using system tenant and added to the structure of the entity in response to receiving the field creation event has the target state of the extension field; and
updating an integration component by updating integration content to map a first local field of a first entity-using system tenant to a second local field of a second entity-using system tenant.

12. The system of claim 11, wherein the entity is a business object.

13. The system of claim 11, wherein the operations further comprise updating an integration component by updating integration content to map a first local field of a first entity-using system tenant to a second local field of a second entity-using system tenant.

14. The system of claim 11, wherein the operations further comprise enabling, via a user interface, addition of an additional entity-using system tenant to receive the field creation event.

15. The system of claim 11, wherein at least some of the entity-using system tenants are associated with different vendors.

16. A computer program product encoded on a non-transitory storage medium, the product comprising non-transitory, computer readable instructions for causing one or more processors to perform operations via a field extension hub, the operations comprising:
receiving, from a customer, a request to modify a structure of an entity used in a customer landscape by adding an extension field to the entity, wherein the customer landscape includes multiple system tenants of different types of systems, and the extension field is to be added to at least two different systems used by the customer, wherein the at least two different systems are provided by different vendors, and each system of the at least two different systems includes an entity-using system tenant that uses instances of the entity in at least one process;
in response to receiving the request to modify the structure of the entity, determining, from among the multiple system tenants, at least one entity-using system tenant that uses instances of the entity in at least one process;
providing event-pairing information to each entity-using system tenant to enable each entity-using system tenant to receive extension field events;
receiving field attribute values for a set of field attributes for the extension field, wherein the field attribute values describe a target state of the extension field;
generating, using the received field attribute values, a field creation event that instructs an entity-using system tenant receiving the field creation event to modify the structure of the entity in that entity-using system tenant by creating a local field that has the target state of the extension field in that entity-using system tenant and adding the local field to the structure of the entity; and
sending the field creation event to each entity-using system tenant, wherein each respective local field created by a respective entity-using system tenant and added to the structure of the entity in response to receiving the field creation event has the target state of the extension field; and
updating an integration component by updating integration content to map a first local field of a first entity-using system tenant to a second local field of a second entity-using system tenant.

17. The computer program product of claim 16, wherein the entity is a business object.

18. The computer program product of claim 16, wherein the operations further comprise updating an integration component by updating integration content to map a first local field of a first entity-using system tenant to a second local field of a second entity-using system tenant.

19. The computer program product of claim 16, wherein the operations further comprise enabling, via a user interface, addition of an additional entity-using system tenant to receive the field creation event.

* * * * *